United States Patent
Jang et al.

(10) Patent No.: US 11,996,939 B2
(45) Date of Patent: May 28, 2024

(54) METHOD AND DEVICE FOR TRANSMITTING DATA IN WIRELESS LAN SYSTEM

(71) Applicant: LG ELECTRONICS INC., Seoul (KR)

(72) Inventors: Insun Jang, Seoul (KR); Jeongki Kim, Seoul (KR); Eunsung Park, Seoul (KR); Dongguk Lim, Seoul (KR); Jinsoo Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 485 days.

(21) Appl. No.: 17/283,796

(22) PCT Filed: Oct. 16, 2019

(86) PCT No.: PCT/KR2019/013546
§ 371 (c)(1),
(2) Date: Apr. 8, 2021

(87) PCT Pub. No.: WO2020/080813
PCT Pub. Date: Apr. 23, 2020

(65) Prior Publication Data
US 2021/0391947 A1      Dec. 16, 2021

(30) Foreign Application Priority Data

Oct. 17, 2018    (KR) .......................... 10-2018-0124051

(51) Int. Cl.
*H04W 4/00*    (2018.01)
*H04L 1/00*    (2006.01)
(Continued)

(52) U.S. Cl.
CPC ....... *H04L 1/0069* (2013.01); *H04W 72/0453* (2013.01); *H04W 74/0808* (2013.01); *H04W 84/12* (2013.01)

(58) Field of Classification Search
CPC ... H04L 1/0069; H04L 1/0041; H04L 1/0072; H04L 1/0025; H04L 1/0075;
(Continued)

(56) References Cited

U.S. PATENT DOCUMENTS 11,716,757 B2 *    8/2023    Yang ................... H04L 27/0006
                                                        370/329
2016/0095040 A1    3/2016    Valliappan et al.
(Continued)

OTHER PUBLICATIONS

Deng, et al., "IEEE 802.11ax: Highly Efficient WLANs for Intelligent Information Infrastructure," IEEE Communications Magazine, Dec. 2017, 8 pages.
(Continued)

*Primary Examiner* — Chuong T Ho
(74) *Attorney, Agent, or Firm* — LEE, HONG, DEGERMAN, KANG & WAIMEY

(57) ABSTRACT

A method and a device for transmitting data in a wireless LAN system are presented. Particularly, a transmission STA transmits information about a preamble puncturing pattern to a reception STA. The transmission STA transmits data to the reception STA through a 320 MHz band on the basis of the preamble puncturing pattern. The preamble puncturing pattern is determined on the basis of a first bandwidth unit in which a CCA is performed and a second bandwidth unit in which user specific information is repeated. At least one 20 MHz subchannel is punctured in the 320 MHz band on the basis of the preamble puncturing pattern.

17 Claims, 36 Drawing Sheets

(51) Int. Cl.
*H04W 72/0453* (2023.01)
*H04W 74/0808* (2024.01)
*H04W 84/12* (2009.01)

(58) Field of Classification Search
CPC ... H04L 1/1621; H04L 1/1628; H04L 1/1635; H04L 1/1896; H04L 5/0044; H04L 1/00; H04L 5/0096; H04W 72/0453; H04W 74/0808; H04W 84/12; H04W 16/14
USPC .......................................... 370/329, 330, 328
See application file for complete search history.

(56) References Cited

U.S. PATENT DOCUMENTS

| | | |
|---|---|---|
| 2016/0301500 A1 | 10/2016 | Suh et al. |
| 2017/0311191 A1 | 10/2017 | Khawer et al. |
| 2018/0242384 A1* | 8/2018 | Tian ...................... H04W 24/02 |
| 2019/0109684 A1* | 4/2019 | Chen ...................... H04L 5/003 |
| 2019/0141570 A1* | 5/2019 | Verma ................ H04W 28/065 |
| 2019/0253296 A1* | 8/2019 | Chen ...................... H04L 5/0044 |
| 2019/0260553 A1* | 8/2019 | Porat ...................... H04L 5/0053 |
| 2021/0250125 A1* | 8/2021 | Park ...................... H04L 27/2603 |
| 2021/0320830 A1* | 10/2021 | Park ...................... H04L 27/2603 |
| 2021/0320831 A1* | 10/2021 | Park ...................... H04L 27/2621 |
| 2022/0030625 A1* | 1/2022 | Yang ...................... H04L 5/001 |

OTHER PUBLICATIONS

Chen, et al., "Discussions on the PHY features for EHT," Intel, IEEE 802.11-18/1461r0, Intel, Sep. 2018, 20 pages.

\* cited by examiner

FIG. 2
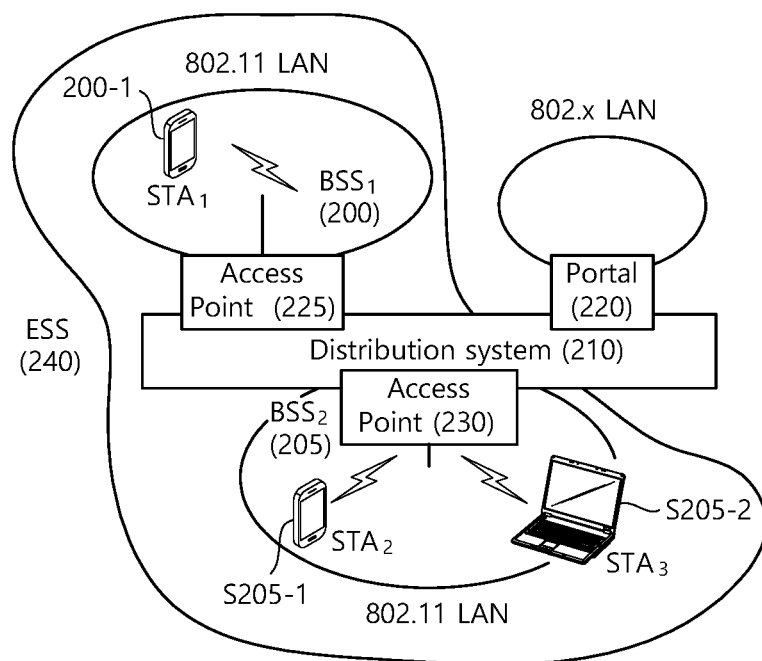
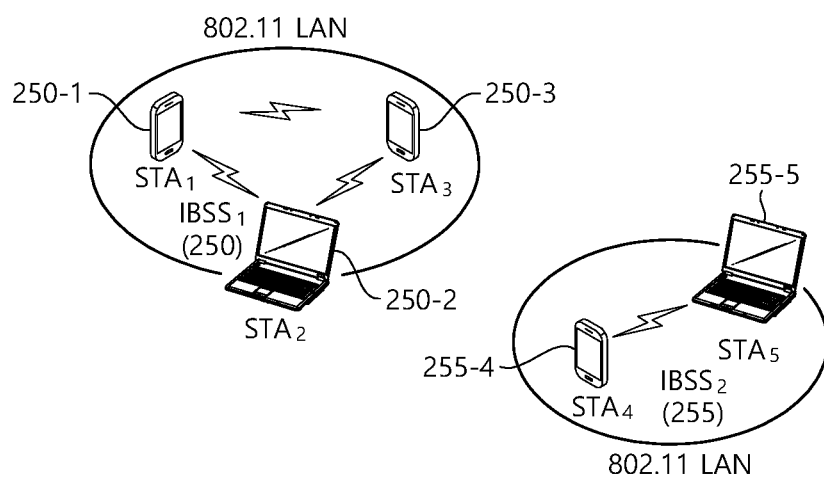

FIG. 4
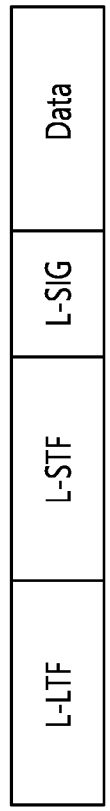
PPDU Format (IEEE 802.11a/g)
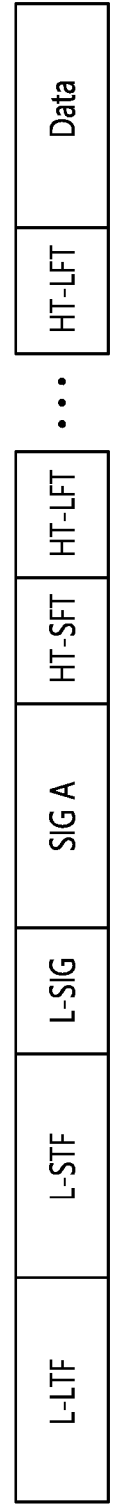
HT PPDU Format (IEEE 802.11n)
VHT PPDU Format (IEEE 802.11ac)
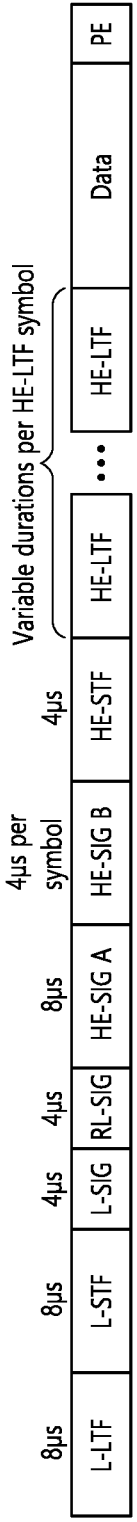

FIG. 18

| 8μs | 8μs | 4μs | 4μs | | | | | | |
|---|---|---|---|---|---|---|---|---|---|
| L-LTF | L-STF | L-SIG | RL-SIG | SIG A | SIG B | STF | LTF | Data | PE |

FIG. 21

| User-Specific Information | A | B | A | B | A | B | A | B | A | B | A | B | A | B | A | B |
|---|---|---|---|---|---|---|---|---|---|---|---|---|---|---|---|---|
| Number (Unit : 20MHz) | 1 | 2 | 3 | 4 | 5 | 6 | 7 | 8 | 9 | 10 | 11 | 12 | 13 | 14 | 15 | 16 |
| Case 1 |  | ▨ |  |  |  |  |  |  |  |  |  |  |  |  |  |  |
| Case 2 |  | ▨ | ▨ | ▨ | ▨ | ▨ | ▨ | ▨ |  |  |  |  |  |  |  |  |
| Case 3 |  |  | ▨ | ▨ | ▨ | ▨ | ▨ | ▨ |  |  |  |  |  |  |  |  |

Extended to 13 to 16 in 320 MHz

At least one

FIG. 25

| User-Specific Information | A | B | C | D | A | B | C | D | A | B | C | D | A | B | C | D |
|---|---|---|---|---|---|---|---|---|---|---|---|---|---|---|---|---|
| Number (Unit: 20MHz) | 1 | 2 | 3 | 4 | 5 | 6 | 7 | 8 | 9 | 10 | 11 | 12 | 13 | 14 | 15 | 16 |
| Case 1 |  | ▨ |  |  | ▨ |  | ▨ | ▨ |  |  |  |  |  |  |  |  |
| Case 2 |  |  | ▨ | ▨ | ▨ | ▨ | ▨ |  |  |  |  |  |  |  |  |  |
| Case 3 |  | ▨ | ▨ | ▨ | ▨ | ▨ | ▨ | ▨ |  |  |  |  |  |  |  |  |
| Case 4 |  |  |  | ▨ | ▨ | ▨ |  | ▨ |  |  |  |  |  |  |  |  |
| Case 5 |  |  |  |  | ▨ | ▨ | ▨ |  |  |  |  |  |  |  |  |  |
| Case 6 |  | ▨ | ▨ | ▨ | ▨ | ▨ | ▨ | ▨ |  |  |  |  |  |  |  |  |
| Case 7 |  | ▨ | ▨ | ▨ | ▨ | ▨ |  | ▨ |  |  |  |  |  |  |  |  |
| Case 8 |  |  |  |  |  |  |  |  |  |  |  |  |  |  |  |  |

Extended to 13 to 16 in 320 MHz

At least one

FIG. 27

| User-Specific Information | A | B | A | B | A | B | A | B | A | B | A | B | A | B | A | B |
|---|---|---|---|---|---|---|---|---|---|---|---|---|---|---|---|---|
| Number (Unit: 40MHz) | 1 | | 2 | | 3 | | 4 | | 5 | | 6 | | 7 | | 8 | |
| Case 1 | | | At least one | | | | | | | | | | | | | |

Extended to 7 and 8 in 320 MHz

FIG. 29

| User-Specific Information | A | B | C | D | A | B | C | D | A | B | C | D | A | B | C | D |
|---|---|---|---|---|---|---|---|---|---|---|---|---|---|---|---|---|
| Number (Unit: 40MHz) | 1 | | 2 | | 3 | | 4 | | 5 | | 6 | | 7 | | 8 | |
| Case 1 | | | At least one | | | | | | | | | | | | | |
| Case 2 | | | | | At least one | | | | | | | | | | | |

Extended to 7 and 8 in 320 MHz

FIG. 31

| User-Specific Information | A | B | A | B | A | B | A | B | A | B | A | B | A | B |
|---|---|---|---|---|---|---|---|---|---|---|---|---|---|---|
| Number (Unit: 80MHz) | 1 | | 2 | | | | 3 | | | | 4 | | | |
| Case 1 | | | | | | | | | | | | | | |

Extended to 4 in 320 MHz

FIG. 32

| User-Specific Information | A | B | C | D | A | B | C | D | A | B | C | D | A | B | C | D |
|---|---|---|---|---|---|---|---|---|---|---|---|---|---|---|---|---|
| Number (Unit: 40MHz) | 1 | | | | 2 | | | | 3 | | | | 4 | | | |
| Case 1 | | | | | | | | | | | | | | | | |

Extended to 4 in 320 MHz

US 11,996,939 B2

METHOD AND DEVICE FOR TRANSMITTING DATA IN WIRELESS LAN SYSTEM

CROSS-REFERENCE TO RELATED APPLICATIONS

This application is the National Stage filing under 35 U.S.C. 371 of International Application No. PCT/KR2019/013546, filed on Oct. 16, 2019, which claims the benefit of Korean Patent Application No. 10-2018-0124051 filed on Oct. 17, 2018, the contents of which are all hereby incorporated by reference herein in their entirety.

BACKGROUND

Field

The present disclosure relates to a technique for transmitting data in a wireless local area network (WLAN) system and, more particularly, to a method and a device for transmitting data by performing preamble puncturing in a 240 MHz or 320 MHz band in a WLAN system.

Related Art

A wireless local area network (WLAN) has been improved by various methods. For example, IEEE 802.11ax proposes an improved communication environment by employing orthogonal frequency division multiple access (OFDMA) and downlink multi-user multiple-input multiple-output (DL MU MIMO) techniques.

The present disclosure proposes technical features that can be used according to a new communication standard. The new communication standard may be, for example, an extremely high throughput (EHT) standard that is under discussion in recent times. The EHT standard may employ a newly proposed increased bandwidth, an improved PHY layer protocol data unit (PPDU) structure, an improved sequence, a hybrid automatic repeat request (HARQ) technique, and the like. The EHT standard may be referred to as IEEE 802.11be.

In the new WLAN standard, an increased number of spatial streams may be used. In this case, a scheme for signaling in a WLAN system may need to be improved in order to properly use the increased number of spatial streams.

SUMMARY

The present disclosure proposes a method and a device for transmitting data in a wireless local area network (WLAN) system.

An embodiment of the present disclosure proposes a method for transmitting data.

The embodiment may be performed in a network environment supporting a next-generation WLAN system. The next-generation WLAN system may be a WLAN system evolving from an 802.11ax system and may satisfy backward compatibility with the 802.11ax system.

The embodiment may be performed by a transmitting station (STA), and the transmitting STA may correspond to an access point (AP). A receiving STA of the embodiment may correspond to a STA supporting an extremely high throughput (EHT) WLAN system.

The transmitting STA transmits information on a preamble puncturing pattern to the receiving STA.

The transmitting STA transmits data to the receiving STA through a 320 MHz band based on the preamble puncturing pattern.

The preamble puncturing pattern is determined based on a unit of a first bandwidth in which clear channel assessment (CCA) is performed and a unit of a second bandwidth in which user-specific information is repeated. That is, the transmitting STA may determine the preamble puncturing pattern so that the receiving STA can decode all the user-specific information.

Among a total of 16 20 MHz subchannels in the 320 MHz band, all or some remaining 20 MHz subchannels including a 20 MHz subchannel determined to be idle based on CCA information may be determined to be busy.

At least one 20 MHz subchannel is punctured based on the preamble puncturing pattern in the 320 MHz band. The at least one 20 MHz subchannel may be included in the remaining 20 MHz subchannels.

According to an embodiment proposed in the present disclosure, it is possible to transmit data by performing preamble puncturing on a secondary channel determined to be busy in a 240 MHz or 320 MHz band, thereby increasing channel and resource efficiency.

BRIEF DESCRIPTION OF THE DRAWINGS

FIG. 2 is a conceptual diagram illustrating the structure of a wireless local area network (WLAN).

FIG. 4 illustrates an example of a PPDU used in an IEEE standard.

FIG. 18 illustrates an example of a PPDU used in the present disclosure.

FIG. 21 illustrates an example of a preamble puncturing pattern in 240 MHz and 320 MHz bands according to an embodiment.

FIG. 25 illustrates still another example of a preamble puncturing pattern in the 240 MHz and 320 MHz bands.

FIG. 27 illustrates yet another example of a preamble puncturing pattern in the 240 MHz and 320 MHz bands.

FIG. 29 illustrates still another example of a preamble puncturing pattern in the 240 MHz and 320 MHz bands.

FIG. 31 illustrates yet another example of a preamble puncturing pattern in the 240 MHz and 320 MHz bands.

FIG. 32 illustrates still another example of a preamble puncturing pattern in the 240 MHz and 320 MHz bands.

DESCRIPTION OF EXEMPLARY EMBODIMENTS

As used herein, a slash (/) or comma may indicate "and/or". For example, "A/B" may indicate "A and/or B" and therefore may indicate "only A", "only B", or "A and B". Technical features that are separately described in one drawing may be implemented separately or may be implemented simultaneously.

As used herein, parentheses may indicate "for example". Specifically, "control information (EHT-Signal)" may mean that "EHT-Signal" is proposed as an example of "control information". Further, "control information (i.e., EHT-signal)" may also mean that "EHT-signal" is proposed as an example of "control information".

The following examples of the present disclosure may be applied to various wireless communication systems. For example, the following examples of the present disclosure may be applied to a wireless local area network (WLAN) system. For example, the present disclosure may be applied to IEEE 802.11a/g/n/ac or IEEE 802.11ax. The present disclosure may also be applied to a newly proposed EHT standard or IEEE 802.11be. Further, the examples of the present disclosure may be applied to a new WLAN standard evolving from the EHT standard or IEEE 802.11be.

Hereinafter, technical features of a WLAN system to which the present disclosure is applicable are described in order to describe technical features of the present disclosure.

Figure 1:
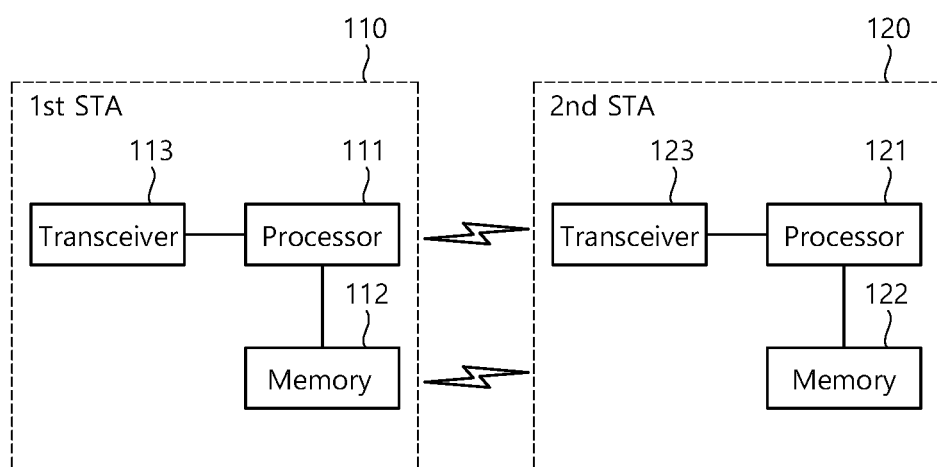
FIG. 1 illustrates an example of a transmitting device and/or a receiving device according to the present disclosure.

FIG. 1 illustrates an example of a transmitting device and/or a receiving device according to the present disclosure.

The example of FIG. 1 may perform various technical features to be described below. FIG. 1 includes two stations (STAs). The STAs 110 and 120 may be referred to as various terms, such as mobile terminals, wireless devices, wireless transmit/receive units (WTRUs), user equipments (UEs), mobile stations (MSs), mobile subscriber units, and simply users. Further, the STAs 110 and 120 may be referred to as various terms, such as receiving apparatuses, transmitting apparatuses, receiving STAs, transmitting STAs, receiving devices, and transmitting devices.

The STAs 110 and 120 may serve as access points (APs) or non-APs. That is, the STAs 110 and 120 of the present disclosure may perform functions of APs and/or non-APs.

The STAs 110 and 120 of the present disclosure may support various communication standards in addition to the IEEE 802.11 standards. For example, the STAs 110 and 120 may support 3GPP communication standards (e.g., LTE, LTE-A, and 5G NR standards). The STAs of the present disclosure may be configured as various devices, such as mobile phones, vehicles, and personal computers.

In the present disclosure, the STAs 110 and 120 may include a medium access control (MAC) and a physical layer interface for a wireless medium according to the IEEE 802.11 specifications.

A first STA 110 may include a processor 111, a memory 112, and a transceiver 113. The illustrated processor, memory, and transceiver may be configured as separate chips, or at least two blocks/functions thereof may be configured through a single chip.

The transceiver 113 of the first STA performs an operation of transmitting or receiving a signal. Specifically, the transceiver 113 may transmit or receive an IEEE 802.11 packet (e.g., an IEEE 802.11a/b/g/n/ac/ax/be packet or the like).

For example, the first STA 110 may perform an intended operation of an AP. For example, the processor 111 of the AP may receive a signal through the transceiver 113, may process the received signal, may generate a transmission signal, and may perform control for signal transmission. The memory 112 of the AP may store a signal (i.e., a received signal) received through the transceiver 113 and may store a signal (i.e., a transmission signal) to be transmitted through the transceiver.

For example, a second STA 120 may perform an intended operation of a non-AP STA. For example, a transceiver 123 of the non-AP performs an operation of transmitting or receiving a signal. Specifically, the transceiver 123 may transmit or receive an IEEE 802.11 packet (e.g., an IEEE 802.11a/b/g/n/ac/ax/be packet or the like).

For example, a processor 121 of the non-AP STA may receive a signal through the transceiver 123, may process the received signal, may generate a transmission signal, and may perform control for signal transmission. A memory 122 of the non-AP STA may store a signal (i.e., a received signal) received through the transceiver 123 and may store a signal (i.e., a transmission signal) to be transmitted through the transceiver.

For example, in the following specification, an operation of a device indicated as an AP may be performed by the first STA 110. Specifically, the operation of the device indicated as the AP may be controlled by the processor 111 of the first STA 110, and a related signal may be transmitted or received through the transceiver 113 controlled by the processor 111 of the first STA 110. Further, control information related to the operation of the AP or transmission/reception signals of the AP may be stored in the memory 112 of the first STA 110.

For example, in the following specification, an operation of a device indicated as a non-AP (or user STA) may be performed by the second STA 120. Specifically, the operation of the device indicated as the non-AP may be controlled by the processor 121 of the second STA 120, and a related signal may be transmitted or received through the transceiver 123 controlled by the processor 121 of the second STA 120. Further, control information related to the operation of the non-AP or transmission/reception signals of the non-AP may be stored in the memory 212 of the second STA 120.

FIG. 2 is a conceptual view illustrating the structure of a wireless local area network (WLAN).

An upper part of FIG. 2 illustrates the structure of an infrastructure basic service set (BSS) of institute of electrical and electronic engineers (IEEE) 802.11.

Referring the upper part of FIG. 2, the wireless LAN system may include one or more infrastructure BSSs (200, 205) (hereinafter, referred to as BSS). The BSSs (200, 205), as a set of an AP and an STA such as an access point (AP) (225) and a station (STA1) (200-1) which are successfully synchronized to communicate with each other, are not concepts indicating a specific region. The BSS (205) may include one or more STAs (205-1, 205-2) which may be joined to one AP (230).

The BSS may include at least one STA, APs providing a distribution service, and a distribution system (DS) (210) connecting multiple APs.

The distribution system (210) may implement an extended service set (ESS) (240) extended by connecting the multiple BSSs (200, 205). The ESS (240) may be used as a term indicating one network configured by connecting one or more APs (225, 230) through the distribution system (210). The AP included in one ESS (240) may have the same service set identification (SSID).

A portal (220) may serve as a bridge which connects the wireless LAN network (IEEE 802.11) and another network (e.g., 802.X).

In the BSS illustrated in the upper part of FIG. 2, a network between the APs (225, 230) and a network between the APs (225, 230) and the STAs (200-1, 205-1, 205-2) may be implemented. However, the network is configured even between the STAs without the APs (225, 230) to perform communication. A network in which the communication is performed by configuring the network even between the STAs without the APs (225, 230) is defined as an Ad-Hoc network or an independent basic service set (IBSS).

A lower part of FIG. 2 illustrates a conceptual view illustrating the IBSS.

Referring to the lower part of FIG. 2, the IBSS is a BSS that operates in an Ad-Hoc mode. Since the IBSS does not include the access point (AP), a centralized management entity that performs a management function at the center does not exist. That is, in the IBSS, STAs (250-1, 250-2, 250-3, 255-4, 255-5) are managed by a distributed manner. In the IBSS, all STAs (250-1, 250-2, 250-3, 255-4, 255-5) may be constituted by movable STAs and are not permitted to access the DS to constitute a self-contained network.

Figure 3:
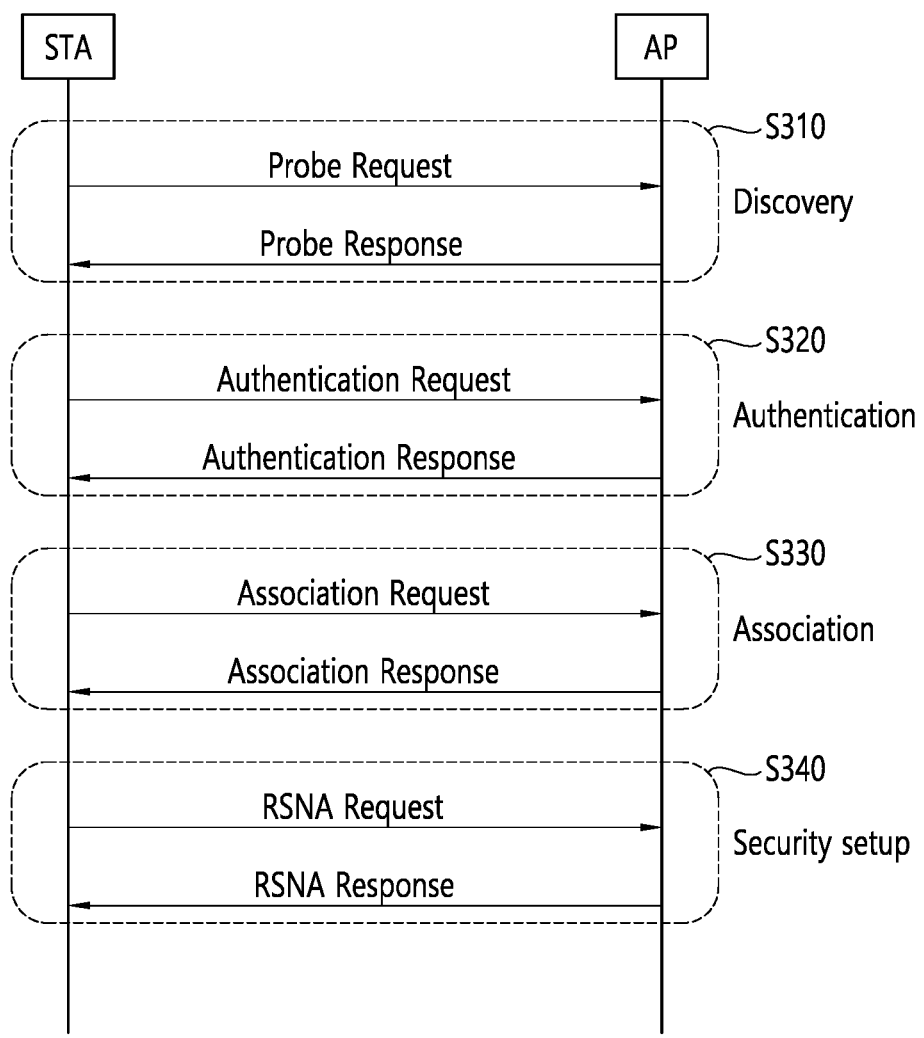
FIG. 3 illustrates a general link setup process.

FIG. 3 illustrates a general link setup process.

In S310, a STA may perform a network discovery operation. The network discovery operation may include a scanning operation of the STA. That is, to access a network, the STA needs to discover a participating network. The STA needs to identify a compatible network before participating in a wireless network, and a process of identifying a network present in a particular area is referred to as scanning. Scanning methods include active scanning and passive scanning.

FIG. 3 illustrates a network discovery operation including an active scanning process. In active scanning, a STA performing scanning transmits a probe request frame and waits for a response to the probe request frame in order to identify which AP is present around while moving to channels. A responder transmits a probe response frame as a response to the probe request frame to the STA having transmitted the probe request frame. Here, the responder may be a STA that transmits the last beacon frame in a BSS of a channel being scanned. In the BSS, since an AP transmits a beacon frame, the AP is the responder. In an IBSS, since STAs in the IBSS transmit a beacon frame in turns, the responder is not fixed. For example, when the STA transmits a probe request frame via channel 1 and receives a probe response frame via channel 1, the STA may store BSS-related information included in the received probe response frame, may move to the next channel (e.g., channel 2), and may perform scanning (e.g., transmits a probe request and receives a probe response via channel 2) by the same method.

Although not shown in FIG. 3, scanning may be performed by a passive scanning method. In passive scanning, a STA performing scanning may wait for a beacon frame while moving to channels. A beacon frame is one of management frames in IEEE 802.11 and is periodically transmitted to indicate the presence of a wireless network and to enable the STA performing scanning to find the wireless network and to participate in the wireless network. In a BSS, an AP serves to periodically transmit a beacon frame. In an IBSS, STAs in the IBSS transmit a beacon frame in turns. Upon receiving the beacon frame, the STA performing scanning stores information on a BSS included in the beacon frame and records beacon frame information in each channel while moving to another channel. The STA having received the beacon frame may store BSS-related information included in the received beacon frame, may move to the next channel, and may perform scanning in the next channel by the same method.

After discovering the network, the STA may perform an authentication process in S320. The authentication process may be referred to as a first authentication process to be clearly distinguished from the following security setup operation in S240. The authentication process in S320 may include a process in which the STA transmits an authentication request frame to the AP and the AP transmits an authentication response frame to the STA in response. The authentication frames used for an authentication request/response are management frames.

The authentication frames may include information on an authentication algorithm number, an authentication transaction sequence number, a status code, a challenge text, a robust security network (RSN), and a finite cyclic group.

The STA may transmit the authentication request frame to the AP. The AP may determine whether to allow the authentication of the STA based on the information included in the received authentication request frame. The AP may provide the authentication processing result to the STA via the authentication response frame.

When the STA is successfully authenticated, the STA may perform an association process in S330. The association process includes a process in which the STA transmits an association request frame to the AP and the AP transmits an association response frame to the STA in response. The association request frame may include, for example, information on various capabilities, a beacon listen interval, a service set identifier (SSID), a supported rate, a supported channel, RSN, a mobility domain, a supported operating class, a traffic indication map (TIM) broadcast request, and an interworking service capability. The association response frame may include, for example, information on various capabilities, a status code, an association ID (AID), a supported rate, an enhanced distributed channel access (EDCA) parameter set, a received channel power indicator (RCPI), a received signal-to-noise indicator (RSNI), a mobility domain, a timeout interval (association comeback time), an overlapping BSS scanning parameter, a TIM broadcast response, and a QoS map.

In 340, the STA may perform a security setup process. The security setup process in S340 may include a process of setting up a private key through four-way handshaking, for example, through an extensible authentication protocol over LAN (EAPOL) frame.

FIG. 4 illustrates an example of a PPDU used in an IEEE standard.

As illustrated, various types of PHY protocol data units (PPDUs) are used in IEEE a/g/n/ac standards. Specifically, an LTF and an STF include a training signal, a SIG-A and a SIG-B include control information for a receiving STA, and a data field includes user data corresponding to a PSDU (MAC PDU/aggregated MAC PDU).

FIG. 4 also includes an example of an HE PPDU according to IEEE 802.11ax. The HE PPDU according to FIG. 4 is an illustrative PPDU for multiple users. An HE-SIG-B may be included only in a PPDU for multiple users, and an HE-SIG-B may be omitted in a PPDU for a single user.

As illustrated, the HE-PPDU for multiple users (MUs) may include a legacy-short training field (L-STF), a legacy-long training field (L-LTF), a legacy-signal (L-SIG), a high efficiency-signal A (HE-SIG A), a high efficiency-signal-B (HE-SIG B), a high efficiency-short training field (HE-STF), a high efficiency-long training field (HE-LTF), a data field (alternatively, an MAC payload), and a packet extension (PE) field. The respective fields may be transmitted for illustrated time periods (i.e., 4 or 8 s).

Hereinafter, a resource unit (RU) used for a PPDU is described. An RU may include a plurality of subcarriers (or tones). An RU may be used to transmit a signal to a plurality of STAs according to OFDMA. Further, an RU may also be defined to transmit a signal to one STA. An RU may be used for an STF, an LTF, a data field, or the like.

Figure 5:
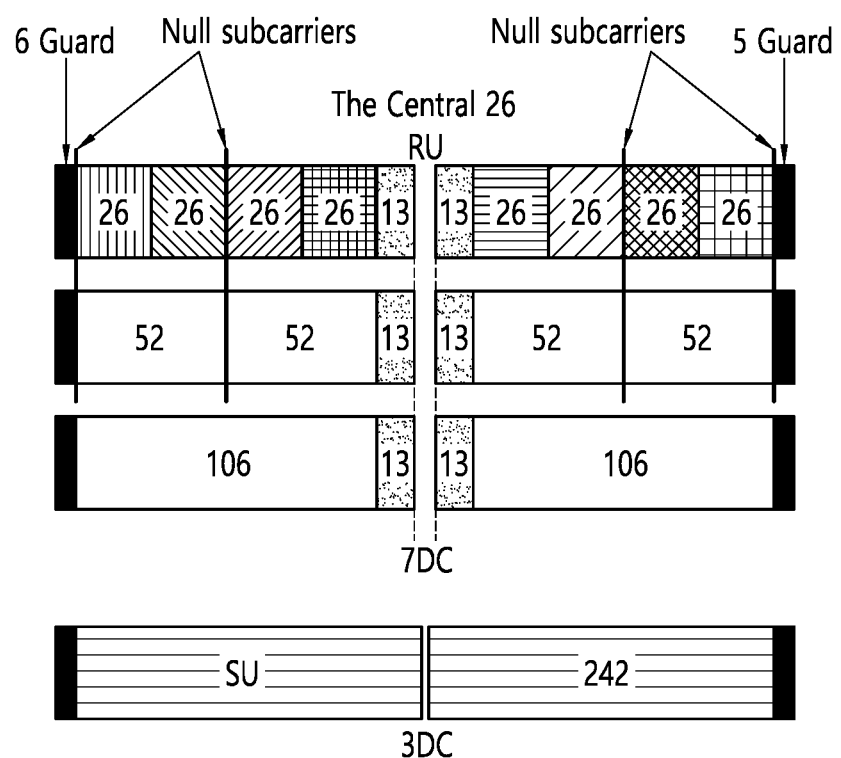
FIG. 5 is a diagram illustrating a layout of resource units (RUs) used in a band of 20 MHz.

FIG. 5 is a diagram illustrating a layout of resource units (RUs) used in a band of 20 MHz.

As illustrated in FIG. 5, resource units (RUs) corresponding to different numbers of tones (that is, subcarriers) are used to constitute some fields of the HE-PPDU. For example, the resources may be allocated by the unit of the RU illustrated for the HE-STF, the HE-LTF, and the data field.

As illustrated in an uppermost part of FIG. 5, 26 units (that is, units corresponding to 26 tones). 6 tones may be used as a guard band in a leftmost band of the 20 MHz band and 5 tones may be used as the guard band in a rightmost band of the 20 MHz band. Further, 7 DC tones may be inserted into a center band, that is, a DC band and a 26-unit corresponding to each 13 tones may be present at left and right sides of the DC band. The 26-unit, a 52-unit, and a 106-unit may be allocated to other bands. Each unit may be allocated for a receiving station, that is, a user.

Meanwhile, the RU layout of FIG. 5 may be used even in a situation for a single user (SU) in addition to the multiple users (MUs) and, in this case, as illustrated in a lowermost part of FIG. 5, one 242-unit may be used and, in this case, three DC tones may be inserted.

In one example of FIG. 5, RUs having various sizes, that is, a 26-RU, a 52-RU, a 106-RU, a 242-RU, and the like are proposed, and as a result, since detailed sizes of the RUs may extend or increase, the embodiment is not limited to a detailed size (that is, the number of corresponding tones) of each RU.

Figure 6:
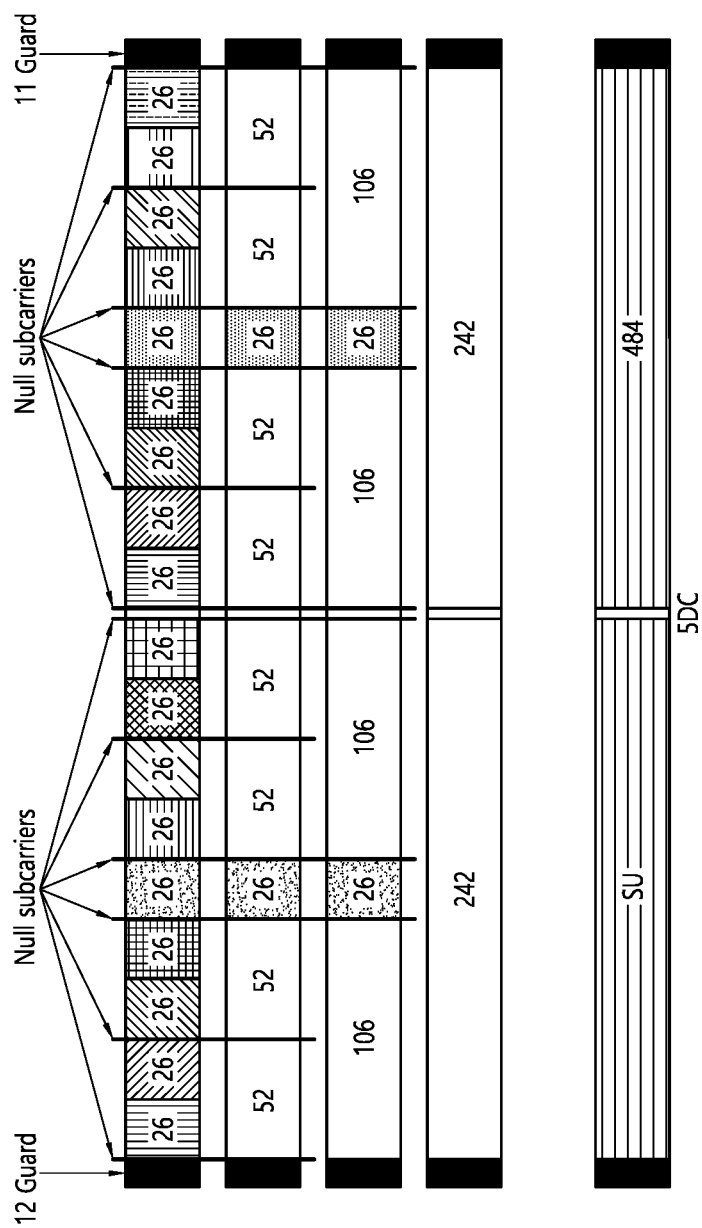
FIG. 6 is a diagram illustrating a layout of resource units (RUs) used in a band of 40 MHz

FIG. 6 is a diagram illustrating a layout of resource units (RUs) used in a band of 40 MHz.

Similarly to a case in which the RUs having various RUs are used in one example of FIG. 5, 26-RU, 52-RU, 106-RU, 242-RU, 484-RU, and the like, may be used even in one example of FIG. 6. Further, 5 DC tones may be inserted into a center frequency, 12 tones may be used as the guard band in the leftmost band of the 40 MHz band and 11 tones may be used as the guard band in the rightmost band of the 40 MHz band.

In addition, as illustrated in FIG. 6, when the RU layout is used for the single user, the 484-RU may be used. That is, the detailed number of RUs may be modified similarly to one example of FIG. 5.

Figure 7:
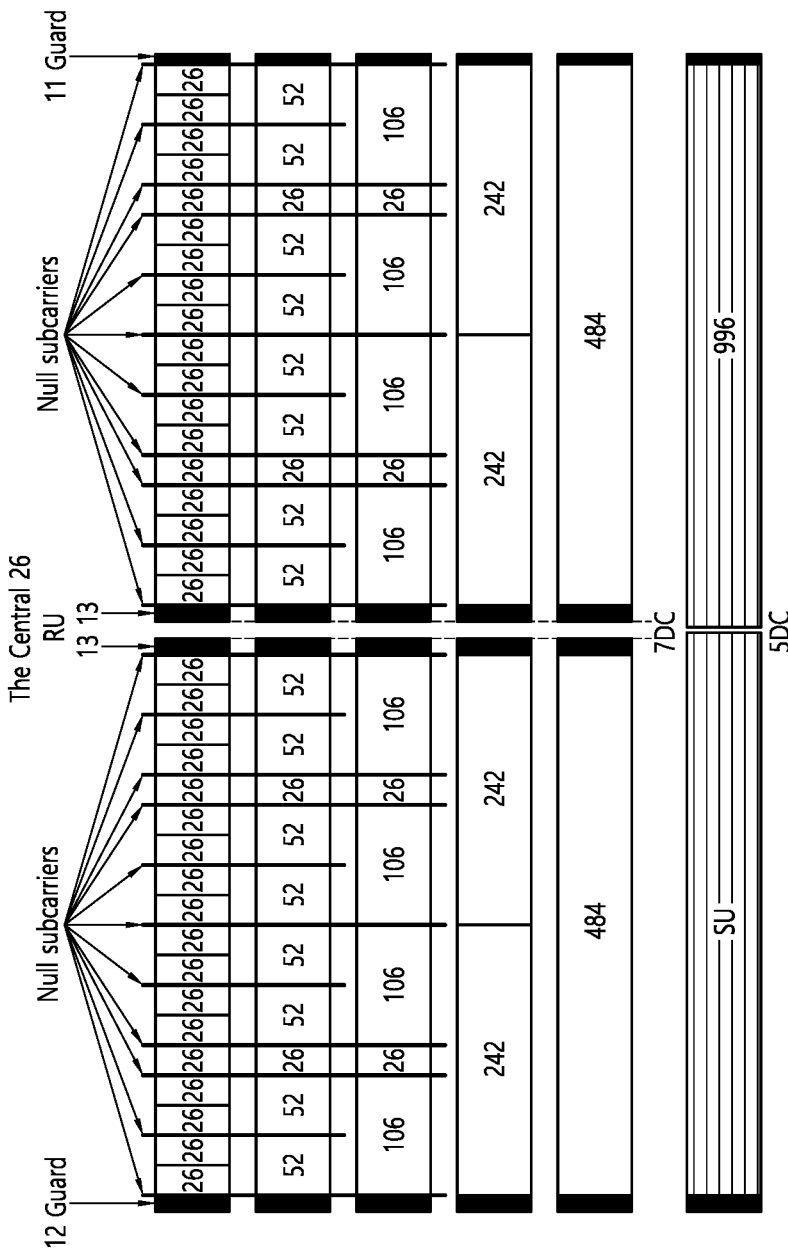
FIG. 7 is a diagram illustrating a layout of resource units (RUs) used in a band of 80 MHz.

FIG. 7 is a diagram illustrating a layout of resource units (RUs) used in a band of 80 MHz.

Figure 26:
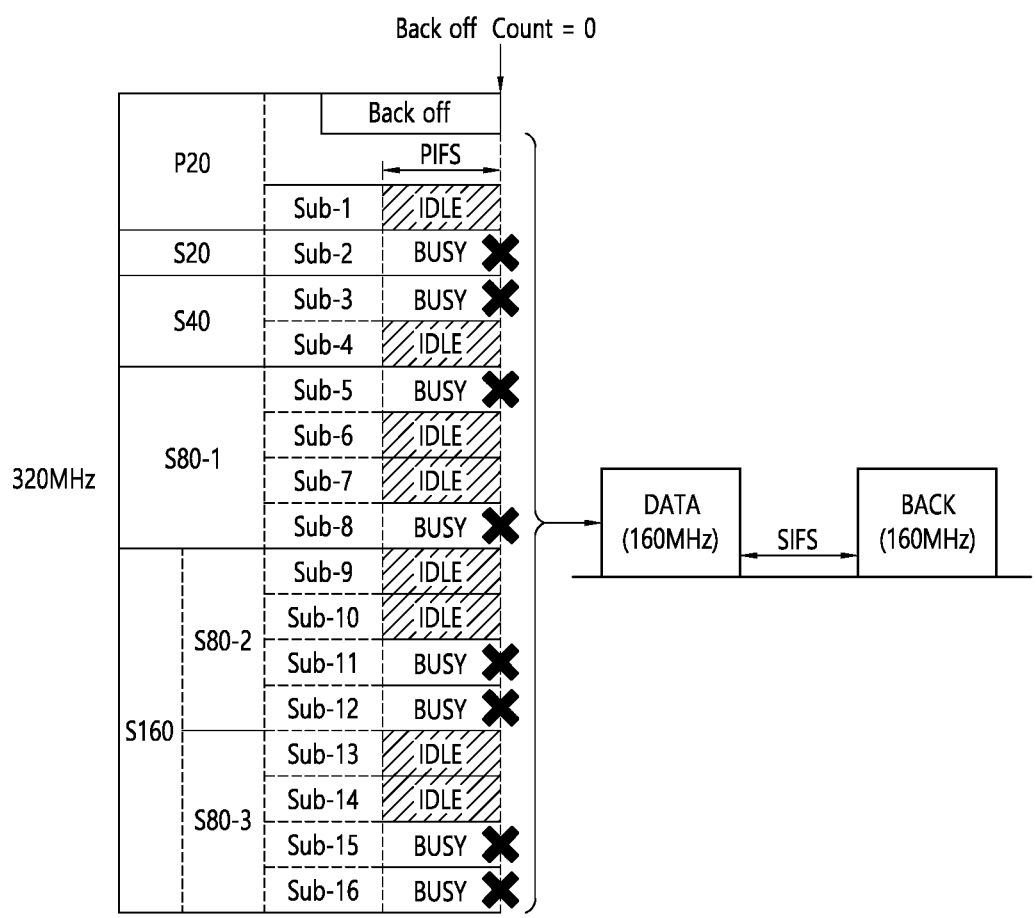
FIG. 26 illustrates still another example of data transmission according to a preamble puncturing pattern in the 240 MHz and 320 MHz bands.

Similarly to a case in which the RUs having various RUs are used in one example of each of FIG. 5 or 6, 26-RU, 52-RU, 106-RU, 242-RU, 484-RU, and the like, may be used even in one example of FIG. 7. Further, 7 DC tones may be inserted into the center frequency, 12 tones may be used as the guard band in the leftmost band of the 80 MHz band and 11 tones may be used as the guard band in the rightmost band of the 80 MHz band. In addition, the 26-RU may be used, which uses 13 tones positioned at each of left and right sides of the DC band.

Moreover, as illustrated in FIG. 7, when the RU layout is used for the single user, 996-RU may be used and, in this case, 5 DC tones may be inserted.

Meanwhile, the detailed number of RUs may be modified similarly to one example of each of FIG. 5 and FIG. 6.

The RU layouts (i.e., RU locations) illustrated in FIG. 5 to FIG. 7 may also be applied to a new WLAN system (e.g., an EHT system). In a 160 MHz band supported by the new WLAN system, an RU layout for 80 MHz (i.e., the example of FIG. 7) may be repeated twice, or an RU layout for 40 MHz (i.e., the example of FIG. 6) may be repeated four times. When an EHT PPDU is configured in a 320 MHz band, the RU layout for 80 MHz (i.e., the example of FIG. 7) may be repeated four times, or the RU layout for 40 MHz (i.e., the example of FIG. 6) may be repeated eight times.

In the present disclosure, one RU may be allocated for only one STA (e.g., non-AP). Alternatively, a plurality of RUs may be allocated for one STA (e.g., non-AP).

An RU described herein may be used for uplink (UL) communication and downlink (DL) communication. For example, when UL-MU communication solicited by a trigger frame is performed, a transmitting STA (e.g., an AP) may allocate a first RU (e.g., a 26/52/106/242-RU or the like) to a first STA and may allocate a second RU (e.g., a 26/52/106/242-RU or the like) to a second STA through the trigger frame. Thereafter, the first STA may transmit a first trigger-based PPDU based on the first RU, and the second STA may transmit a second trigger-based PPDU based on the second RU. The first and second trigger-based PPDUs are transmitted to the AP in the same time period.

For example, when a DL MU PPDU is configured, a transmitting STA (e.g., an AP) may allocate a first RU (e.g., a 26/52/106/242-RU or the like) to a first STA and may allocate a second RU (e.g., a 26/52/106/242-RU or the like) to a second STA. That is, the transmitting STA (e.g., the AP) may transmit an HE-STF, an HE-LTF, and a data field for the first STA through the first RU and may transmit an HE-STF, an HE-LTF, and a data field for the second STA through the second RU.

Information on an RU layout may be signaled through an HE-SIG-B.

Figure 8:
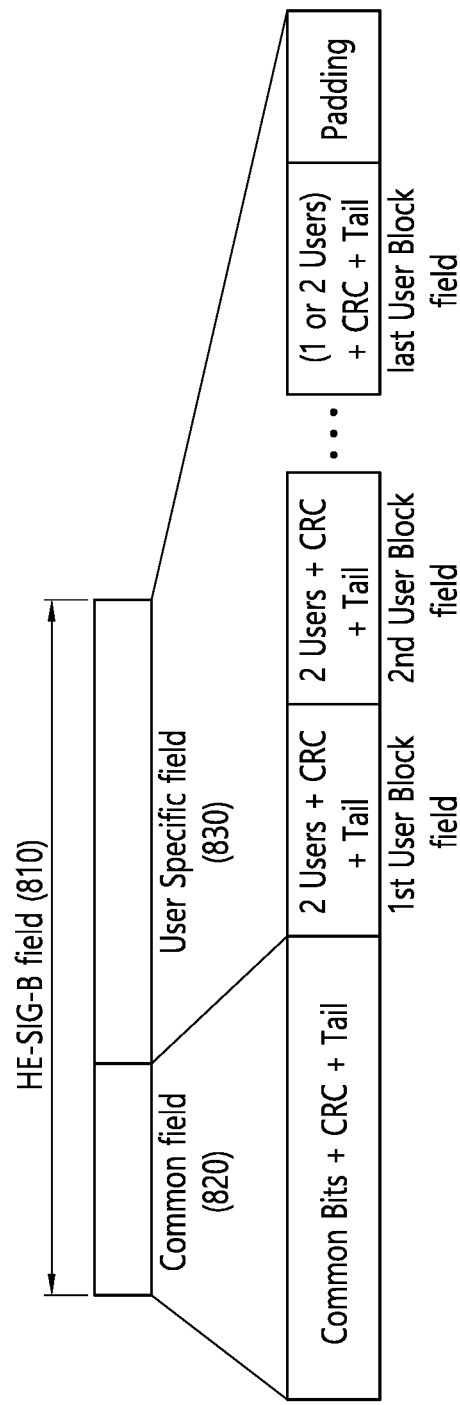
FIG. 8 illustrates the structure of an HE-SIG-B field.

FIG. 8 illustrates the structure of an HE-SIG-B field.

As illustrated, the HE-SIG-B field 810 includes a common field 820 and a user-specific field 830. The common field 820 may include information commonly applied to all users (i.e., user STAs) receiving the SIG-B. The user-specific field 830 may be referred to as a user-specific control field. When the SIG-B is transmitted to a plurality of users, the user-specific field 830 may be applied to only some of the plurality of users.

As illustrated in FIG. 8, the common field 820 and the user-specific field 830 may be separately encoded.

The common field 820 may include RU allocation of N*8 bits information. For example, the RU allocation information may include information on the location of an RU. For example, when a 20 MHz channel is used as shown in FIG. 5, the RU allocation information may include information on which RU (26-RU/52-RU/106-RU) is allocated in which frequency band.

An example in which the RU allocation information includes eight bits is illustrated below.

TABLE 1

| RU Allocation subfield (B7 B6 B5 B4 B3 B2 B1 B0) | #1 | #2 | #3 | #4 | #5 | #6 | #7 | #8 | #9 | Number of entries |
|---|---|---|---|---|---|---|---|---|---|---|
| 00000000 | 26 | 26 | 26 | 26 | 26 | 26 | 26 | 26 | 26 | 1 |
| 00000001 | 26 | 26 | 26 | 26 | 26 | 26 | 26 | 52 | | 1 |
| 00000010 | 26 | 26 | 26 | 26 | 26 | 52 | | 26 | 26 | 1 |
| 00000011 | 26 | 26 | 26 | 26 | 26 | 52 | | 52 | | 1 |
| 00000100 | 26 | 26 | 52 | | 26 | 26 | 26 | 26 | 26 | 1 |
| 00000101 | 26 | 26 | 52 | | 26 | 26 | 26 | 52 | | 1 |
| 00000110 | 26 | 26 | 52 | | 26 | 52 | | 26 | 26 | 1 |
| 00000111 | 26 | 26 | 52 | | 26 | 52 | | 52 | | 1 |
| 00001000 | 52 | | 26 | 26 | 26 | 26 | 26 | 26 | 26 | 1 |
| 00001001 | 52 | | 26 | 26 | 26 | 26 | 26 | 52 | | 1 |
| 00001010 | 52 | | 26 | 26 | 26 | 52 | | 26 | 26 | 1 |

As in the example of FIG. 5, up to nine 26-RUs may be allocated in a 20 MHz channel. As illustrated in Table 1, when the RU allocation information of the common field 820 is set to "00000000", nine 26-RUs may be allocated in the channel (i.e., 20 MHz). Further, as illustrated in Table 1, when the RU allocation information of the common field 820 is set to "00000001", seven 26-RUs and one 52-RU are disposed in the channel. That is, in the example of FIG. 5, the 52-RU may be allocated on the rightmost side, and the seven 26-RUs may be allocated to the left side of the 52-RU.

The example of Table 1 shows only some of RU locations that can be indicated by RU allocation information. For example, the RU allocation information may additionally include an example illustrated below in Table 2.

TABLE 2

| | | | | | | | | | | |
|---|---|---|---|---|---|---|---|---|---|---|
| 00010$y_2y_1y_0$ | 52 | | 52 | | — | | 106 | | | 8 |
| 00011$y_2y_1y_0$ | | 106 | | | — | 52 | | 52 | | 8 |
| 00100$y_2y_1y_0$ | 26 | 26 | 26 | 26 | 26 | | 106 | | | 8 |
| 00101$y_2y_1y_0$ | 26 | 26 | | 52 | 26 | | 106 | | | 8 |
| 00110$y_2y_1y_0$ | 52 | | 26 | 26 | 26 | | 106 | | | 8 |
| 00111$y_2y_1y_0$ | 52 | | | 52 | 26 | | 106 | | | 8 |
| 01000$y_2y_1y_0$ | | 106 | | | 26 | 26 | 26 | 26 | 26 | 8 |
| 01001$y_2y_1y_0$ | | 106 | | | 26 | 26 | 26 | | 52 | 8 |
| 01010$y_2y_1y_0$ | | 106 | | | 26 | 52 | | 26 | 26 | 8 |
| 01011$y_2y_1y_0$ | | 106 | | | 26 | 52 | | | 52 | 8 |
| 0110$y_1y_0z_1z_0$ | | 106 | | | — | | 106 | | | 16 |

"01000y2y1y0" relates to an example in which a 106-RU is allocated on the leftmost side of the 20 MHz channel, and five 26-RUs are allocated on the right side of the 106-RU. In this case, a plurality of STAs (e.g., user STAs) may be allocated to the 106-RU based on a MU-MIMO technique. Specifically, up to eight STAs (e.g., user STAs) may be allocated to the 106-RU, and the number of STAs (e.g., user STAs) allocated to the 106-RU is determined based on 3-bit information (y2y1y0). For example, when the 3-bit information (y2y1y0) is set to N, the number of STAs (e.g., user STAs) allocated to the 106-RU based on the MU-MIMO technique may be N+1.

Generally, a plurality of different STAs (e.g., user STAs) may be allocated to a plurality of RUs. However, a plurality of STAs (e.g., user STAs) may be allocated to one RU having a specific size (e.g., 106 subcarriers) or more based on the MU-MIMO technique.

As shown in FIG. 8, the user-specific field 830 may include a plurality of user fields. As described above, the number of STAs (e.g., user STAs) allocated to a specific channel may be determined based on the RU allocation information of the common field 820. For example, when the RU allocation information of the common field 820 is "00000000", one user STA may be allocated to each of nine 26-RUs (i.e., a total of nine user STAs may be allocated). That is, up to nine user STAs may be allocated to the specific channel through an OFDMA technique. In other words, up to nine user STAs may be allocated to the specific channel through a non-MU-MIMO technique.

For example, when RU allocation is set to "01000y2y1y0", a plurality of user STAs may be allocated to the leftmost 106-RU through the MU-MIMO technique, and five user STAs may be allocated to the five 26-RUs disposed on the right side through the non-MU-MIMO technique. A specific example is illustrated in FIG. 9.

Figure 9:
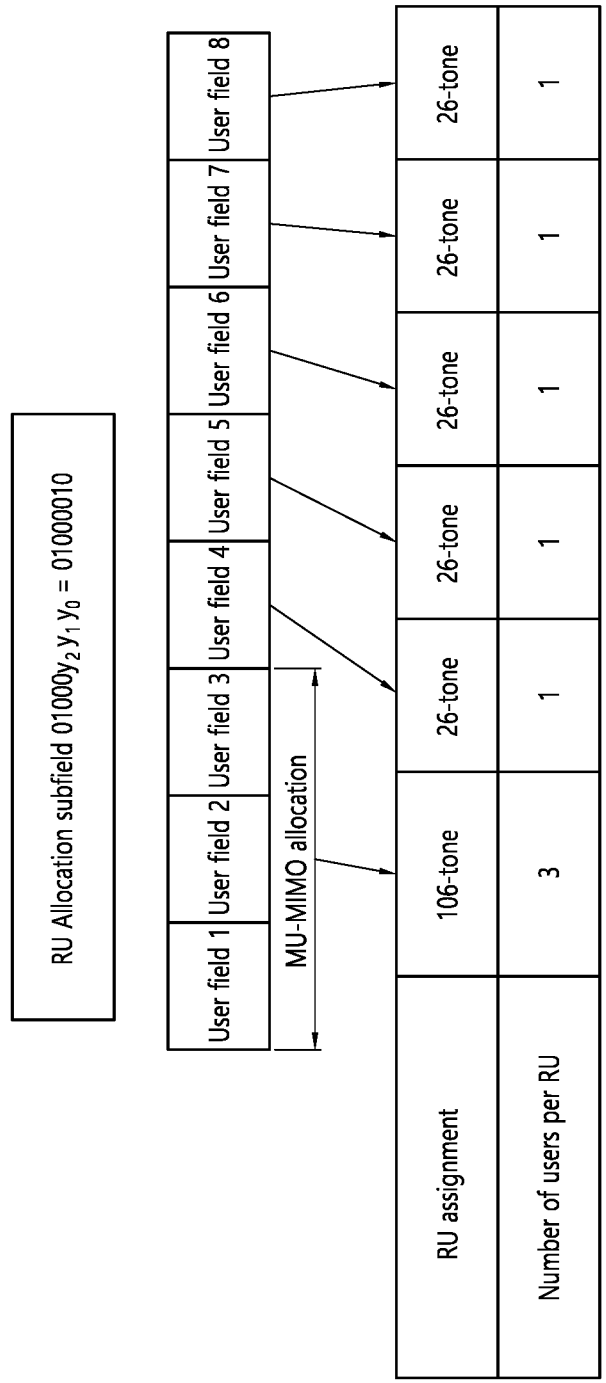
FIG. 9 illustrates an example in which a plurality of user STAs is allocated to the same RU through a MU-MIMO technique.

FIG. 9 illustrates an example in which a plurality of user STAs is allocated to the same RU through a MU-MIMO technique.

For example, when the RU allocation is set to "01000y2y1y0" as shown in FIG. 9, a 106-RU may be allocated on the leftmost side of a specific channel and five 26-RUs may be allocated on the right side of the 106-RU according to Table 2. A total of three user STAs may be allocated to the 106-RU through the MU-MIMO technique. As a result, since a total of eight user STAs are allocated, the user-specific field 830 of the HE-SIG-B may include eight user fields.

The eight user fields may be included in a order illustrated in FIG. 9. Further, as illustrated in FIG. 8, two user fields may be configured as one user block field.

The user fields illustrated in FIG. 8 and FIG. 9 may be configured based on two formats. That is, a user field related to the MU-MIMO technique may be configured in a first format, and a user field related to the non-MU-MIMO technique may be configured in a second format. Referring to the example of FIG. 9, user fields 1 to 3 may be based on the first format, and user fields 4 to 8 may be based on the second format.

The first format or the second format may include bit information having the same length (e.g., 21 bits).

Figure 10:
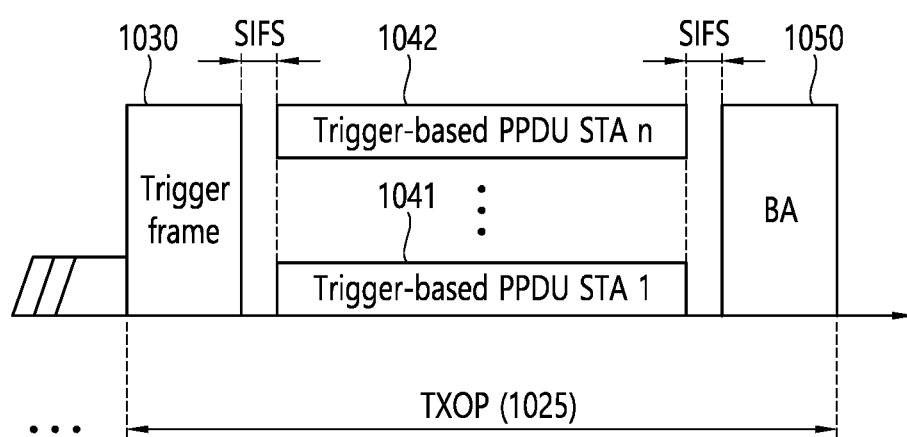
FIG. 10 illustrates a UL-MU operation.

FIG. 10 illustrates a UL-MU operation. As illustrated, a transmitting STA (e.g., an AP) may perform channel access through a contention (i.e., a backoff operation) and may transmit a trigger frame 1030. That is, the transmitting STA (e.g., the AP) may transmit a PPDU including the trigger frame 1330. When the PPDU including the trigger frame is received, a trigger-based (TB) PPDU is transmitted after a delay of SIFS.

TB PPDUs 1041 and 1042 may be transmitted in the same time period and may be transmitted from a plurality of STAs (e.g., user STAs) of which AIDs are indicated in the trigger frame 1030. An ACK frame 1050 of the TB PPDUs may be configured in various forms.

Specific features of a trigger frame are described with reference to FIG. 11 to FIG. 13. When UL-MU communication is used, an orthogonal frequency division multiple access (OFDMA) technique or a MU MIMO technique may also be used, or the OFDMA technique and the MU MIMO technique may be used simultaneously.

Figure 11:
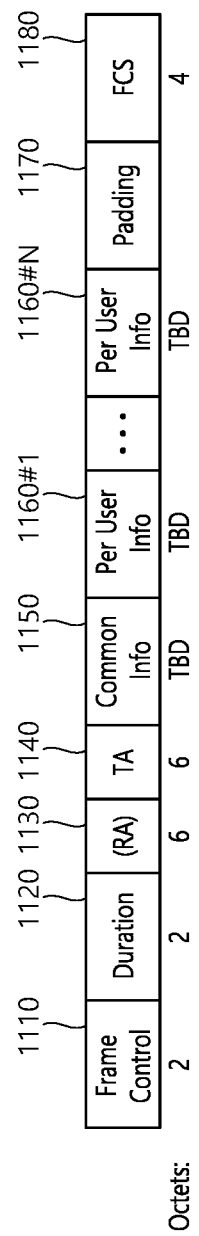
FIG. 11 illustrates an example of a trigger frame.

FIG. 11 illustrates an example of a trigger frame. The trigger frame illustrated in FIG. 11 allocates resources for uplink multiple-user (MU) transmission and may be transmitted, for example, from an AP. The trigger frame may be configured as a MAC frame and may be included in a PPDU.

Some fields illustrated in FIG. 11ay be omitted, and other fields may be added. The length of each illustrated field may be varied.

A frame control field 1110 shown in FIG. 11 may include information on a version of a MAC protocol and other additional control information, and a duration field 1120 may include time information for NAV setting or information on an identifier (e.g., AID) of a STA.

An RA field 1130 may include address information on a receiving STA of the trigger frame and may be optionally omitted. A TA field 1140 includes address information on an STA (e.g., AP) for transmitting the trigger frame, and a common information field 1150 includes common control information applied to the receiving STA for receiving the trigger frame. For example, a field indicating the length of an L-SIG field of an uplink PPDU transmitted in response to the trigger frame or information controlling the content of a SIG-A field (i.e., an HE-SIG-A field) of the uplink PPDU transmitted in response to the trigger frame may be included. Further, as the common control information, information on the length of a CP of the uplink PPDU transmitted in response to the trigger frame or information on the length of an LTF thereof may be included.

The trigger frame of FIG. 11 preferably includes per user information fields 1160 #1 to 1160 #N corresponding to the number of receiving STAs receiving the trigger frame of FIG. 11. A per user information field may also be referred to as an allocation field.

Further, the trigger frame of FIG. 11 may include a padding field 1170 and a sequence field 1180.

Each of the per user information fields 1160 #1 to 1160 #N illustrated in FIG. 11 may include a plurality of subfields.

Figure 12:
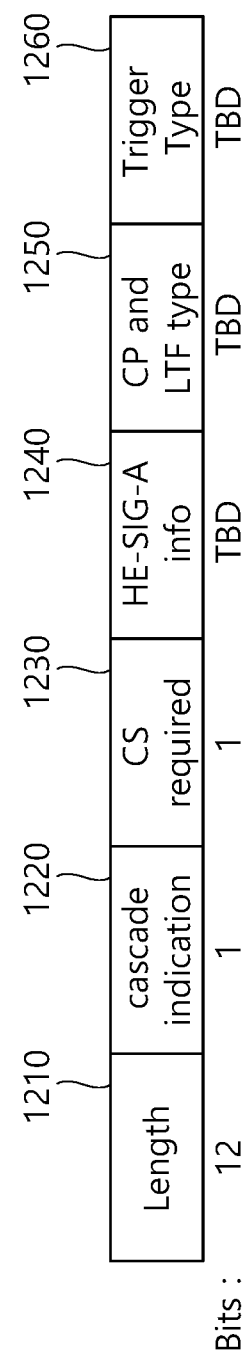
FIG. 12 illustrates an example of a common information field of the trigger frame.

FIG. 12 illustrates an example of a common information field included in a trigger frame. Some subfields illustrated in FIG. 12 may be omitted, and other subfields may be added. The length of each illustrated subfield may be varied.

A length field 1210 has that same value as a length field of an L-SIG field of an uplink PPDU, which is transmitted in response to the trigger frame, and the length field of the L-SIG field of the uplink PPDU indicates the length of the uplink PPDU. As a result, the length field 1210 of the trigger frame may be used to indicate the length of the corresponding uplink PPDU.

A cascade indicator field 1220 indicates whether a cascade operation is performed. A cascade operation means that both downlink MU transmission and uplink MU transmission are performed within the same TXOP, that is, downlink MU transmission is performed, and then uplink MU transmission is performed after a preset period of time (e.g., SIFS). In the cascade operation, only one transmission device performing downlink communication (e.g., AP) may exist, and a plurality of transmission devices performing uplink communication (e.g., non-AP) may exist.

A CS request field 1230 indicates whether the status or NAV of a wireless medium is required to be considered in a situation where a reception device receiving the trigger frame transmits a corresponding uplink PPDU.

An HE-SIG-A information field 1240 may include information controlling the content of a SIG-A field (i.e., HE-SIG-A field) of the uplink PPDU transmitted in response to the trigger frame.

A CP and LTF type field 1250 may include information on an LTF length and a CP length of the uplink PPDU transmitted in response to the trigger frame. A trigger type field 1060 may indicate a purpose of the trigger frame, for example, general triggering, triggering for beamforming, a request for a block ACK/NACK, or the like.

In the present specification, it may be assumed that the trigger type field 1260 of the trigger frame indicates a trigger frame of a basic type for general triggering. For example, a trigger frame of a basic type may be referred to as a basic trigger frame.

Figure 13:
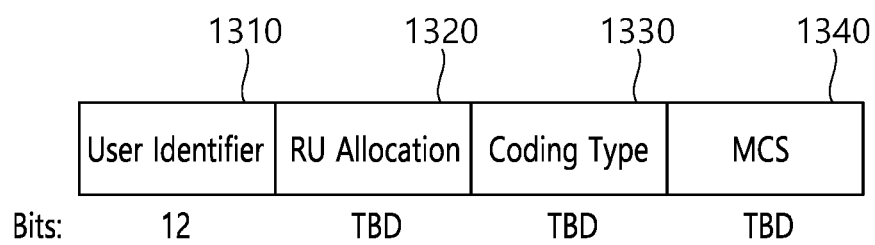
FIG. 13 illustrates an example of a subfield included in a per user information field.

FIG. 13 illustrates an example of a subfield included in a per user information field. The per user information field 1300 in FIG. 13 may be understood as one of the per user information fields 1160 #1 to 1160 #N illustrated above in FIG. 11. Some subfields included in the per user information field 1300 in FIG. 13 may be omitted, and other subfields may be added. The length of each illustrated subfield may be varied.

A user identifier field 1310 of FIG. 13 indicates an identifier of an STA (i.e., a receiving STA) which corresponds to the per user information, and an example of the identifier may be the entirety or part of an association identifier (AID) of the receiving STA.

An RU allocation field 1320 may be included in the per user information field. Specifically, when the receiving STA, which is identified by the user identifier field 1310, transmits a TB PPDU in response to the trigger frame, the STA transmits the TB PPDU via an RU indicated by the RU allocation field 1320. In this case, the RU indicated by the RU allocation field 1320 may be the RU illustrated in FIG. 5, FIG. 6, or FIG. 7.

A subfield of FIG. 13 may include a coding type field 1330. The coding type field 1330 may indicate the coding type of the TB PPDU. For example, when BBC coding is applied to the TB PPDU, the coding type field 1330 may be set to 1. When LDPC coding is applied to the TB PPDU, the coding type field 1330 may be set to 0.

The subfield of FIG. 13 may include a MCS field 1340. The MCS field 1340 may indicate a MCS technique applied to the TB PPDU. For example, when BCC coding is applied to the TB PPDU, the coding type field 1330 may be set to 1. When LDPC coding is applied to the TB PPDU, the coding type field 1330 may be set to 0.

Hereinafter, a UL OFDMA-based random access (UORA) technique will be described.

Figure 14:
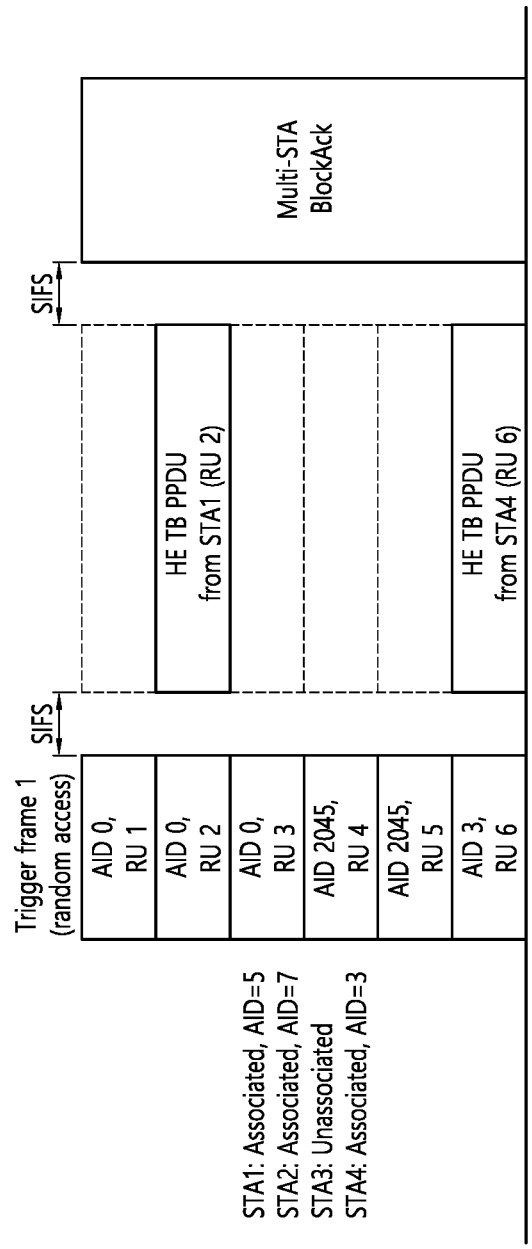
FIG. 14 illustrates technical characteristics of a UROA technique.

FIG. 14 illustrates technical characteristics of a UROA technique.

As illustrated in FIG. 14, a transmitting STA (e.g., an AP) may allocate six RU resources through a trigger frame. Specifically, the AP may allocate a first RU resource (AID 0, RU 1), a second RU resource (AID 0, RU 2), a third RU resource (AID 0, RU 3), a fourth RU resource (AID 2045, RU 4), a fifth RU resource (AID 2045, RU 5), and a sixth RU resource (AID 3, RU 6). Information on AID 0, AID 3, or AID 2045 may be included, for example, in the user identifier field 1310 of FIG. 13. Information on RU 1 to RU 6 may be included, for example, in the RU allocation field 1320 of FIG. 13. AID=0 may refer to a UORA resource for an associated STA, and AID=2045 may refer to a UORA resource for an unassociated STA. Accordingly, the first to third RU resources of FIG. 14 may be used as UORA resources for the associated STA, the fourth and fifth RU resources of FIG. 14 may be used as UORA resources for the unassociated STA, and the sixth RU resource of FIG. 14 may be used as a resource for a normal UL MU.

In the example of FIG. 14, as the OFDMA random access backoff (OBO) counter of STA1 is reduced to 0, STA1 randomly selects the second RU resource (AID 0, RU 2). In addition, since the OBO counter of STA2/3 is greater than 0, no uplink resource is allocated to STA2/3. Further, in FIG. 14, since the AID (i.e., AID=3) of STA 4 is included in the trigger frame, STA4 is allocated RU 6 without a backoff.

Specifically, since STA1 of FIG. 14 is an associated STA, there are a total of three eligible RA RUs (RU 1, RU 2, and RU 3) for STA1. Thus, STA1 has reduced the OBO counter by 3, so that the OBO counter is 0. Since STA2 of FIG. 14 is an associated STA, there are a total of three eligible RA RUs (RU 1, RU 2, and RU 3) for STA2. Thus, STA2 has reduced the OBO counter by 3, but the OBO counter is greater than 0. Since STA3 of FIG. 14 is an unassociated STA, there are a total of two eligible RA RUs (RU 4 and RU 5) for STA3. Thus, STA3 has reduced the OBO counter by 2, but the OBO counter is greater than 0.

Figure 15:
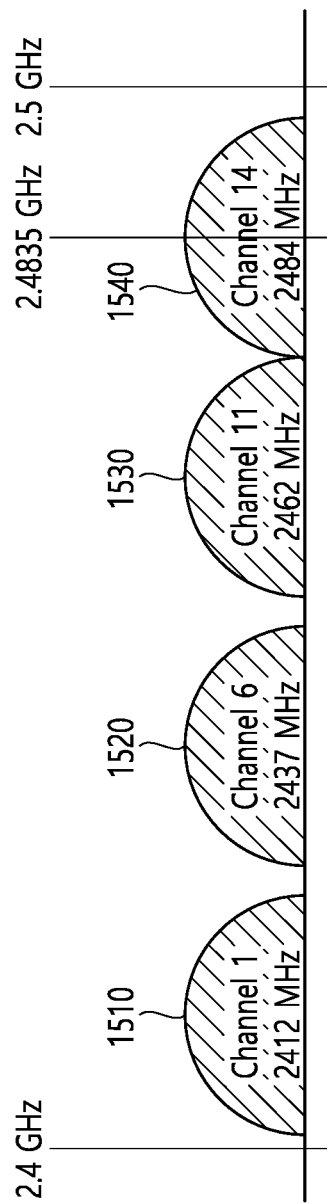
FIG. 15 illustrates an example of a channel used/supported/defined in a 2.4 GHz band.

FIG. 15 illustrates an example of a channel used/supported/defined in a 2.4 GHz band.

The 2.4 GHz band may be referred to as a different term, such as a first band (bandwidth). The 2.4 GHz band may refer to a frequency range in which channels having a center frequency adjacent to 2.4 GHz (e.g., channels having a center frequency ranging from 2.4 to 2.5 GHz) are used/supported/defined.

The 2.4 GHz band may include a plurality of 20 MHz channels. 20 MHz in the 2.4 GHz band may have a plurality of channel indexes (e.g., index 1 to index 14). For example, a 20 MHz channel that is allocated channel index 1 may have a center frequency of 2.412 GHz, a 20 MHz channel that is allocated channel index 2 may have a center frequency of 2.417 GHz, and a 20 MHz channel that is allocated channel index N may have a center frequency of 2.407+0.005*N GHz. A channel index may be referred to by various terms, such as a channel number. Specific values of a channel index and a center frequency may be changed.

FIG. 15 illustrates four channels in the 2.4 GHz band. Each of a first frequency range 1510 to a fourth frequency range 1540 that are illustrated may include one channel. For example, the first frequency range 1510 may include channel 1 (a 20 MHz channel having index 1). The center frequency of channel 1 may be set to 2412 MHz. A second frequency range 1520 may include channel 6. The center frequency of channel 6 may be set to 2437 MHz. A third frequency range 1530 may include channel 11. The center frequency of channel 11 may be set to 2462 MHz. The fourth frequency range 1540 may include channel 14. The center frequency of channel 14 may be set to 2484 MHz.

Figure 16:
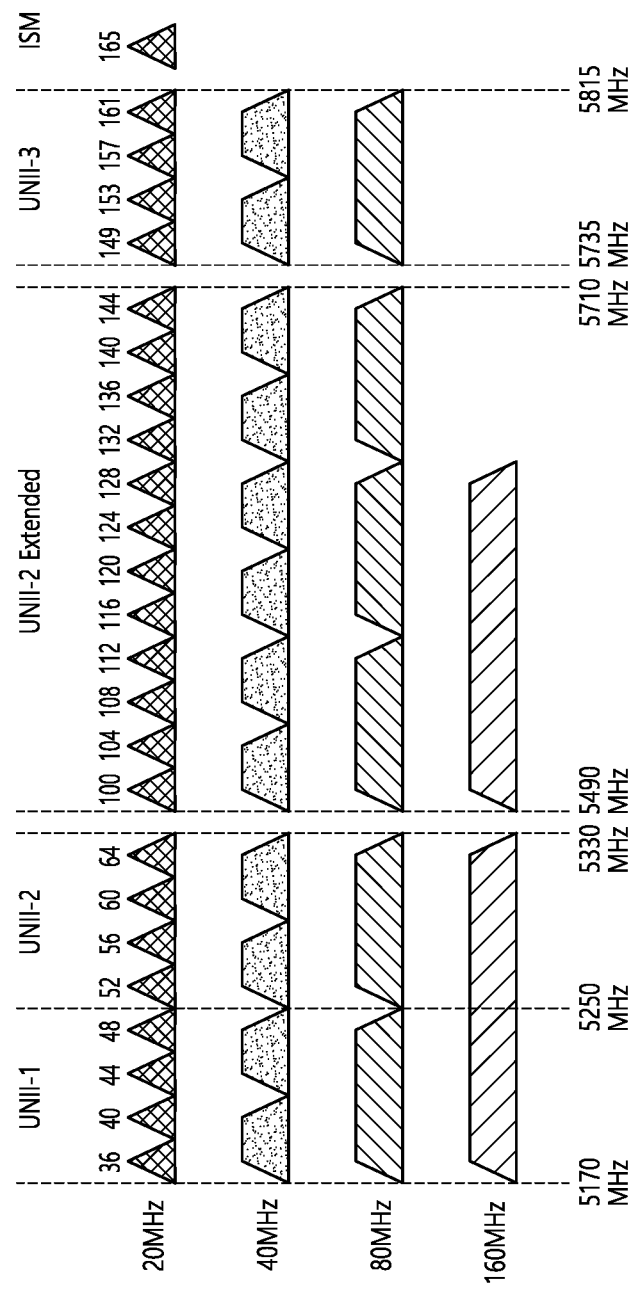
FIG. 16 illustrates an example of a channel used/supported/defined in a 5 GHz band.

FIG. 16 illustrates an example of a channel used/supported/defined in a 5 GHz band.

The 5 GHz band may be referred to as a different term, such as a second band/bandwidth. The 5 GHz band may refer to a frequency range in which channels having a center frequency of 5 GHz or more and less than 6 GHz (or less than 5.9 GHz) are used/supported/defined. Alternatively, the 5 GHz band may include a plurality of channels between 4.5 GHz and 5.5 GHz. Specific numerical values illustrated in FIG. 16 may be changed.

The plurality of channels in the 5 GHz band includes Unlicensed National Information Infrastructure (UNII)-1, UNII-2, UNII-3, and ISM. UNII-1 may be referred to as UNII Low. UNII-2 may include frequency ranges referred to as UNII Mid and UNII-2 Extended. UNII-3 may be referred to as UNII-Upper.

The plurality of channels may be configured in the 5 GHz band, and the bandwidth of each channel may be variously set to 20 MHz, 40 MHz, 80 MHz, or 160 MHz. For example, a frequency range/area of 5170 MHz to 5330 MHz in UNII-1 and UNII-2 may be divided into eight 20 MHz channels. The frequency range/area of 5170 MHz to 5330 MHz may be divided into four channels according to a 40 MHz frequency range. The frequency range/area of 5170 MHz to 5330 MHz may be divided into two channels according to an 80 MHz frequency range. Alternatively, the frequency range/area of 5170 MHz to 5330 MHz frequency domain/range may be divided into one channel according to a 160 MHz frequency range.

Figure 17:
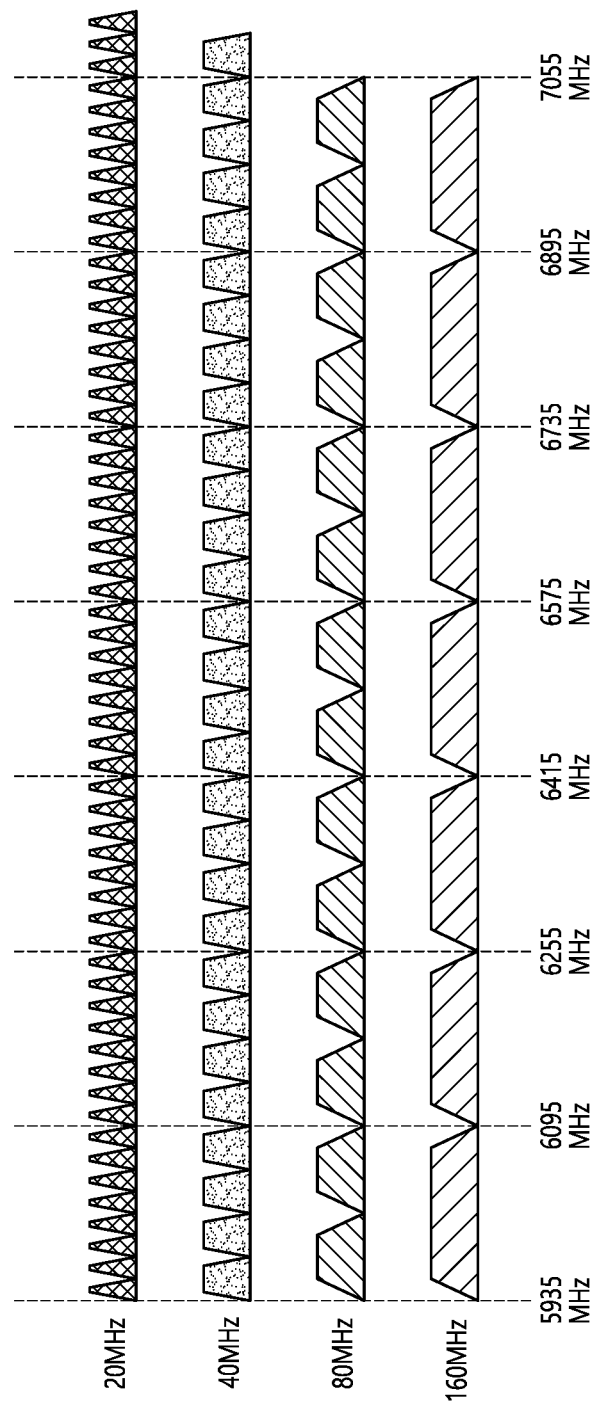
FIG. 17 illustrates an example of a channel used/supported/defined in a 6 GHz band.

FIG. 17 illustrates an example of a channel used/supported/defined in a 6 GHz band.

The 6 GHz band may be referred to as a different term, such as a third band/bandwidth. The 6 GHz band may refer to a frequency range in which channels having a center frequency of 5.9 GHz or more are used/supported/defined. Specific numerical values illustrated in FIG. 17 may be changed.

For example, a 20 MHz channel of FIG. 17 may be defined from 5.940 GHz. Specifically, a leftmost channel of 20 MHz channels of FIG. 17 may have index (or channel index, channel number, or the like) 1 and may be allocated a center frequency of 5.945 GHz. That is, the center frequency of a channel having index N may be determined to be 5.940+0.005*N GHz.

Accordingly, the indexes (or channel numbers) of the 20 MHz channels of FIG. 17 may be 1, 5, 9, 13, 17, 21, 25, 29, 33, 37, 41, 45, 49, 53, 57, 61, 65, 69, 73, 77, 81, 85, 89, 93, 97, 101, 105, 109, 113, 117, 121, 125, 129, 133, 137, 141, 145, 149, 153, 157, 161, 165, 169, 173, 177, 181, 185, 189, 193, 197, 201, 205, 209, 213, 217, 221, 225, 229, and 233. Further, the indexes (or channel numbers) of 40 MHz channels of FIG. 17 may be 3, 11, 19, 27, 35, 43, 51, 59, 67, 75, 83, 91, 99, 107, 115, 123, 131, 139, 147, 155, 163, 171, 179, 187, 195, 203, 211, 219, and 227 according to the foregoing rule of 5.940+0.005*N GHz.

Although 20, 40, 80, and 160 MHz channels are illustrated in the example of FIG. 17, a 240 MHz channel or a 320 MHz channel may be further added.

Hereinafter, a PPDU transmitted/received by a STA according to the present disclosure will be described.

FIG. 18 illustrates an example of a PPDU used in the present disclosure.

The PPDU of FIG. 18 may be referred to as various terms, such as an EHT PPDU, a transmission PPDU, a reception PPDU, a first-type PPDU, or an Nth-type PPDU. The PPDU may be used in an EHT system and/or in a new WLAN system evolving from the EHT system.

Subfields of FIG. 18 may be changed to various terms. For example, a SIG A field may be referred to as an EHT-SIG-A field, a SIG B field may be referred to as an EHT-SIG-B field, an STF may be referred to as an EHT-STF, and an LTF may be referred to as an EHT-LTF.

In FIG. 18, subcarrier spacing for an L-LTF, an L-STF, an L-SIG field, and an RL-SIG field may be set to 312.5 kHz, and subcarrier spacing for an STF, an LTF, and a data field may be set to 78.125 kHz. That is, the subcarrier indexes of the L-LTF, the L-STF, the L-SIG field, and the RL-SIG field may be expressed in units of 312.5 kHz, and the subcarrier indexes of the STF, the LTF, and the data field may be expressed in units of 78.125 kHz.

The SIG A field and/or the SIG B field of FIG. 18 may include an additional field (e.g., a SIG C or one control symbol field). Subcarrier spacing for all/some of the SIG A field and the SIG B field may be set to 312.5 kHz, and subcarrier spacing for the remaining thereof may be set to 78.125 kHz.

In the PPDU of FIG. 18, the L-LTF and the L-STF may be the same as the existing fields.

The L-SIG field of FIG. 18 may include, for example, 24-bit bit information. For example, the 24-bit information may include a 4-bit rate field, a 1-bit reserved bit, a 12-bit length field, a 1-bit parity bit, and a 6-bit tail bit. For example, the 12-bit length field may include information on the number of octets of a physical service data unit (PSDU). For example, the value of the 12-bit length field may be determined based on the type of the PPDU. For example, when the PPDU is a non-HT PPDU, HT, VHT, or EHT PPDU, the value of the length field may be determined as a multiple of 3. For example, when the PPDU is an HE PPDU, the value of the length field may be determined as a multiple of 3+1 or a multiple of 3+2. That is, the value of the length field may be determined as a multiple of 3 for a non-HT, HT, VHT, or EHT PPDU, and the value of the length field may be determined as a multiple of 3+1 or a multiple of 3+2 for an HE PPDU.

For example, a transmitting STA may apply BCC encoding based on a code rate of 1/2 to the 24-bit information of the L-SIG field. Subsequently, the transmitting STA may obtain a 48-bit BCC coded bit. BPSK modulation may be applied to the 48-bit coded bits, thereby generating 48 BPSK symbols. The transmitting STA may map the 48 BPSK symbols to positions excluding pilot subcarriers {subcarrier indexes −21, −7, +7, and +21} and a DC subcarrier {subcarrier index 0}. As a result, the 48 BPSK symbols may be mapped to subcarrier indexes −26 to −22, −20 to −8, −6 to −1, +1 to +6, +8 to +20, and +22 to +26. The transmitting STA may additionally map a signal of {−1, −1, −1, 1} to the subcarrier index {−28, −27, +27, 28}. The signal may be used for channel estimation in a frequency range corresponding to {−28, −27, +27, 28}.

The transmitting STA may generate the RL-SIG, which is generated to be the same as the L-SIG. BPSK modulation is applied to the RL-SIG. A receiving STA may know that the received PPDU is an HE PPDU or an EHT PPDU based on the presence of the RL-SIG.

After the RL-SIG of FIG. 18, for example, an EHT-SIG-A or one control symbol may be inserted. The symbol (i.e., EHT-SIG-A or one control symbol) subsequent to the RL-SIG may include 26-bit information and may include information for identifying the type of the EHT PPDU. For example, when an EHT PPDU is classified as various types (e.g., an EHT PPDU supporting a SU, an EHT PPDU supporting a MU, an EHT PPDU related to a trigger frame, an EHT PPDU related to extended range transmission, and the like), information on the type of the EHT PPDU may be included in the symbol subsequent to the RL-SIG.

The symbol subsequent to the RL-SIG may include, for example, information on the length of a TXOP and information on a BSS color ID. For example, the SIG-A field may be configured subsequent to the symbol (e.g., one control symbol) subsequent to the RL-SIG. Alternatively, the symbol subsequent to the RL-SIG may be the SIG-A field.

The SIG-A field may include, for example, 1) a DL/UL indicator, 2) a BSS color field, which is an identifier of a BSS, 3) a field including information on the remaining time of the current TXOP, 4) a bandwidth field including information on a bandwidth, 5) a field including information on a MCS applied to the SIG-B, 6) an indication field including information related to whether a dual subcarrier modulation scheme is applied to the SIG-B, 7) a field including information on the number of symbols used for the SIG-B, 8) a field including information on whether the SIG-B is generated across the entire band, 9) a field including information on the type of the LTF/STF, and 10) information on a field indicating the length of the LTF and the length of a CP.

The STF of FIG. 18 may be used to improve automatic gain control estimation in a multiple-input multiple-output (MIMO) environment or an OFDMA environment. The LTF of FIG. 18 may be used to estimate a channel in a MIMO environment or an OFDMA environment.

The STF of FIG. 18 may be configured in various types. For example, a first type of the STF (i.e., 1×STF) may be generated based on a first-type STF sequence in which non-zero coefficients are disposed at an interval of 16 subcarriers. An STF signal generated based on the first-type STF sequence may have a period of 0.8 μs, and the signal having the period of 0.8 μs may be repeated five times into a first-type STF having a length of 4 μs. For example, a second type of the STF (i.e., 2×STF) may be generated based on a second-type STF sequence in which non-zero coefficients are disposed at an interval of eight subcarriers. An STF signal generated based on the second-type STF sequence may have a period of 1.6 μs, and the signal having the period of 1.6 μs may be repeated five times into a second-type EHT-STF having a length of 8 μs. For example, a third type of the STF (i.e., 4×EHT-STF) may be generated based on a third-type STF sequence in which non-zero coefficients are disposed at an interval of 4 subcarriers. An STF signal generated based on the third-type STF sequence may have a period of 3.2 μs, and the signal having the period of 3.2 μs may be repeated five times into a third-type EHT-STF having a length of 16 μs. Only some of the first to third-type EHT-STF sequences may be used. The EHT-LTF may have first, second, and third types (i.e., 1×LTF, 2×LTF, and 4×LTF). For example, the first/second/third-type LTF may be generated based on an LTF sequence in which non-zero coefficients are disposed at an interval of 4/2/1 subcarriers. The first/second/third-type LTF may have a time length of 3.2/6.4/12.8 s. Further, GIs having various lengths (e.g., 0.8/1/6/3.2 s) may be applied to the first/second/third-type LTF.

Information on the type of the STF and/or the LTF (including information on a GI applied to the LTF) may be included in the SIG A field and/or the SIG B field of FIG. 18.

The PPDU of FIG. 18 may be identified as an EHT PPDU based on the following method.

The receiving STA may determine the type of the received PPDU as an EHT PPDU based on the following. For example, when 1) a first symbol after the L-LTF signal of the received PPDU is BPSK, 2) the RL-SIG in which the L-SIG of the received PPDU is repeated is detected, and 3) it is detected that the length of the L-SIG of the received PPDU modulo 3 is 0, the received PPDU may be determined as an EHT PPDU. When the received PPDU is determined as an EHT PPDU, the receiving STA may detect the type (e.g., SU/MU/trigger-based/extended range type) of the EHT PPDU based on the bit information included in the symbol after the RL-SIG of FIG. 18. That is, the receiving STA may determine the received PPDU as an EHT PPDU based on 1) the first symbol after the L-LTF signal, which is BSPK, 2) the RL-SIG that is subsequent to the L-SIG field and is the same as the L-SIG, and 3) the L-SIG including a length field set to 0 as a result of the length modulo 3.

For example, the receiving STA may determine the type of the received PPDU as an HT PPDU based on the following. For example, when 1) the first symbol after the L-LTF signal is BPSK, 2) the RL-SIG in which the L-SIG is repeated is detected, and 3) it is detected that the length of the L-SIG modulo 3 is 1 or 2, the received PPDU may be determined as an HT PPDU.

For example, the receiving STA may determine the type of the received PPDU as a non-HT, HT, or VHT PPDU based on the following. For example, when 1) the first symbol after the L-LTF signal is BPSK, 2) the RL-SIG in which the L-SIG is repeated is not detected, and 3) it is detected that the length of the L-SIG modulo 3 is 0, the received PPDU may be determined as a non-HT, HT, or VHT PPDU.

1. Preamble Puncturing

In downlink (DL) MU transmission, when a subchannel is busy, an AP may select not to fill a specific subchannel of an 80 or 160 MHz channel bandwidth. In an HE-STF, an HE-LTF, and a data field transmitted in an HE format, preamble puncturing is performed by allocating a free subchannel to a user. L-STF, L-LTF, L-SIG, RL-SIG, and HE-SIG-B preamble fields are transmitted in a legacy mode, and no preamble field is transmitted in a corresponding 20 MHz subchannel using a preamble puncturing technique.

Preamble puncturing may be signaled in a bandwidth field of an HE-SIG-A field of an HE MU PPDU.

TABLE 3

Two Parts of HE-SIG-A

| Bit | Field | Number of bits | Description |
| --- | --- | --- | --- |
| B15-B17 | Bandwidth | 3 | Set to 0 for 20 MHz.<br>Set to 1 for 40 MHz.<br>Set to 2 for 80 MHz non-preamble puncturing mode.<br>Set to 3 for 160 MHz and 80 + 80 MHz non-preamble puncturing mode.<br>If the SIGB Compression field is 0:<br>Set to 4 for preamble puncturing in 80 MHz, where in the preamble only the secondary 20 MHz is punctured.<br>Set to 5 for preamble puncturing in 80 MHz, where in the preamble only one of the two 20 MHz sub-channels in secondary 40 MHz is punctured.<br>Set to 6 for preamble puncturing in 160 MHz or 80 + 80 MHz, where in the primary 80 MHz of the preamble only the secondary 20 MHz is punctured.<br>Set to 7 for preamble puncturing in 160 MHz or 80 + 80 MHz, where in the primary 80 MHz of the preamble the primary 40 MHz is present.<br>If the SIGB Compression field is 1 then values 4-7 are reserved. |
| B18-B21 | Number Of HE-SIG-B Symbols Or MU-MIMO Users | 4 | If the HE-SIG-B Compression field is set to 0, indicates the number of OFDM symbols in the HE-SIG-B field: (#15494)<br>Set to the number of OFDM symbols in the HE-SIG-B field minus 1 if the number of OFDM symbols in the HE-SIG-B field is less than 16;<br>Set to 15 to indicate that the number of OFDM symbols in the HE-SIG-B field is equal to 16 if Longer Than 16 HE SIG-B OFDM Symbols Support subfield of the HE Capabilities element transmitted by at least one recipient STA is 0;<br>Set to 15 to indicate that the number of OFDM symbols in the HE-SIG-B field is greater than or equal to 16 if the Longer Than 16 HE SIG-B OFDM Symbols Support subfield of the HE Capabilities element transmitted by all the recipient STAs are 1 and if the HE-SIG-B data rate is less than MCS 4 without DCM. The exact number of OFDM symbols in the HE-SIG-B field is calculated based on the number of User fields in the HE-SIG-B content channel which is indicated by HE-SIG-B common field in this case.<br>If the HE-SIG-B Compression field is set to 1, indicates the number of MU-MIMO users and is set to the number of NU-MIMO users minus 1(#15495). |

TABLE 3-continued

Two Parts of HE-SIG-A

| Bit | Field | Number of bits | Description |
|---|---|---|---|
| B22 | SIGB Compression | 1 | Set to 0 if the Common field in HE-SIG-B is present. Set to 1 if the Cosnmon field in HE-SIG-B is not present.(#16139) |

Referring to Table 3, when the bandwidth field is set to 0 to 3, a non-preamble puncturing mode is set. When a SIGB compression field is 0 (when there is a common field of HE-SIG-B), preamble puncturing may be applied as follows.

When the bandwidth field is set to 4, preamble puncturing may be performed in 80 MHz, where only a secondary 20 MHz may be punctured in the preamble.

When the bandwidth field is set to 5, preamble puncturing may be performed in 80 MHz, where only one of two 20 MHz subchannels in a secondary 40 MHz may be punctured in the preamble.

When the bandwidth field is set to 6, preamble puncturing may be performed in 160 MHz or 80+80 MHz, where only a secondary 20 MHz may be punctured in a primary 80 MHz of the preamble.

When the bandwidth field is set to 7, preamble puncturing may be performed in 160 MHz or 80+80 MHz, where a primary 40 MHz may be present in the primary 80 MHz of the preamble.

Hereinafter, an example in which the AP transmits the MU PPDU using preamble puncturing will be described.

i) When the secondary 40 MHz channel is idle during an interval of PIFS just before the start of a TXOP, the AP may transmit the HE MU PPDU using preamble puncturing in 80 MHz where only a secondary 20 MHz is punctured.

ii) When only one of the two 20 MHz subchannels in the secondary 40 MHz is punctured in the preamble and the secondary 20 MHz channel and one of the two 20 MHz subchannels in the secondary 40 MHz are idle during the interval of PIFS just before the start of the TXOP, the AP may transmit the HE MU PPDU using preamble puncturing in 80 MHz.

iii) When only a secondary 20 MHz is punctured in the primary 80 MHz of the preamble and the secondary 40 MHz channel and at least one of four 20 MHz subchannels in the secondary 80 MHz channel are idle during the interval of PIFS just before the start of the TXOP, the AP may transmit the HE MU PPDU using preamble puncturing in 160 MHz or 80+80 MHz.

iv) When only a primary 40 MHz is present in the primary 80 MHz of the preamble and the secondary 20 MHz channel and at least one of the four 20 MHz subchannels in the secondary 80 MHz channel are idle during the interval of PIFS just before the start of the TXOP, the AP may transmit the HE MU PPDU using preamble puncturing in 160 MHz or 80+80 MHz.

2. Embodiments Applicable to the Present Disclosure

Figure 19:
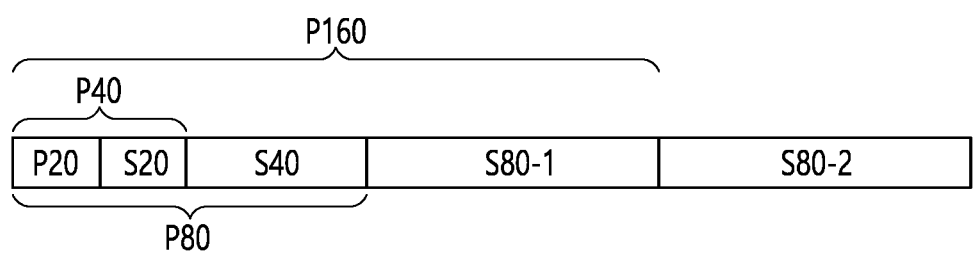
FIG. 19 illustrates an example of the configuration of a primary channel and a secondary channel in a 240 MHz band.

FIG. 19 illustrates an example of the configuration of a primary channel and a secondary channel in a 240 MHz band.

Figure 20:
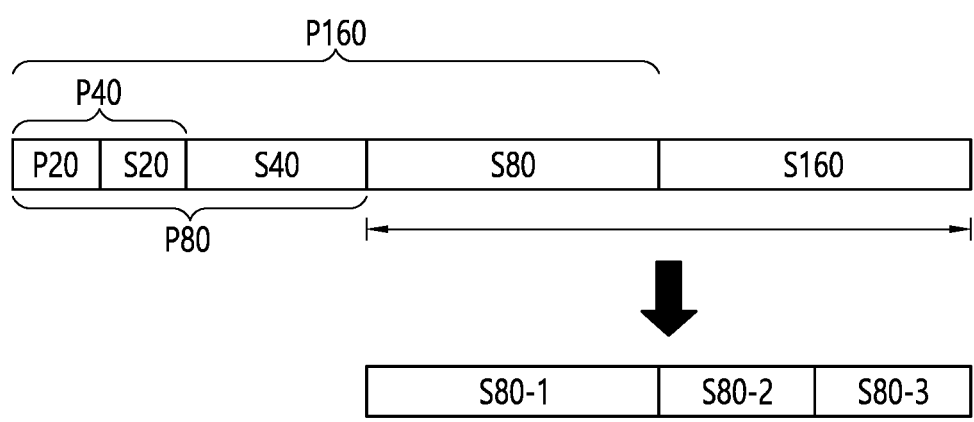
FIG. 20 illustrates an example of the configuration of a primary channel and a secondary channel in a 320 MHz band.

FIG. 20 illustrates an example of the configuration of a primary channel and a secondary channel in a 320 MHz band.

An additional secondary 80 MHz channel (i.e., S80-2) and an additional secondary 160 MHz channel (i.e., S160) are added to the existing 160 MHz bandwidth in FIG. 19 and FIG. 20, respectively. In the present disclosure, S80 and S160 of 320 MHz may also be expressed using S80-1, S80-2, and S80-3, as illustrated in FIG. 14.

When 240/320 MHz is used, a secondary channel of a wide bandwidth, such as S80/S160, is highly likely to be busy, especially in a dense environment, and thus the availability of the channel is significantly reduced. Therefore, to solve this problem, the present disclosure proposes a PPDU transmission method using preamble puncturing for 240/320 MHz that can increase resource (channel use) efficiency. In the present disclosure, PPDU transmission may include both SU transmission and MU transmission.

A preamble puncturing pattern for a 240/320 MHz bandwidth may vary depending on clear channel assessment (CCA) granularity (i.e., a bandwidth unit for performing CCA) and a method of mapping user-specific information to a frequency domain. In particular, since a STA needs to be able to decode all of user-specific information, preamble puncturing needs to be performed in view of the user-specific information. For example, in existing 11ax, CCA is performed with a granularity of 20 MHz, and user-specific information is independently present in units of 20 MHz in a SIG-B in a band of up to 40 MHz, while this independent information in units of 40 MHz is repeated in a band from 80 MHz. For example, pieces of independent user-specific information A and B are present in units of 20 MHz in a 40 MHz band, while the pieces of independent user-specific information A and B for the 40 MHz band are repeated once in a 80 MHz band (40 MHz: A-B, 80 MHz: A-B-A-B)

2.1 Signaling Method for Preamble Puncturing Pattern

Accordingly, the present disclosure proposes a preamble puncturing pattern in 240/320 MHz according to CCA granularity (i.e., 20 MHz/40 MHz/80 MHz) and a method of mapping user-specific information (i.e., in units of 40 MHz/80 MHz). Further, the proposed preamble puncturing pattern may be designed to be signaled based on a bandwidth that can be indicated in a PHY header introduction (e.g., a SIG-A field) to thereby reduce signaling overhead and reduce the complexity of receiver implementation. That is, a transmitting STA may signal a preamble puncturing pattern for decoding all user-specific information in view of CCA granularity and a user-specific information unit through (a bandwidth field of) an HE-SIG-A field.

However, specific RU/bandwidth allocation information may be indicated in a field (e.g., a SIG-B field or a field newly defined in 11be) after the SIG-A field. That is, the transmitting STA may signal the allocation information on which subchannel is punctured and can be used for data transmission according to a preamble puncturing pattern signaled in the SIG-A field through the HE-SIG-B field or the field newly defined in 11be.

2.2 Preamble Puncturing Pattern According to CCA Granularity and User-Specific Information Unit In the present disclosure, channel numbers are represented by 1, 2, and the like from a foremost bandwidth (e.g., P20) according to CCA granularity, and pieces of user-specific information are represented by A, B, and the like according to a unit. For example, when CCA granularity is 20 MHz, P20 is a channel number of 1, and when CCA granularity is 40 MHz, P40 is a channel number of 1.

1) 240/320 MHz, CCA granularity: 20 MHz, User-specific information: Duplicated in units of 40 MHz 1)-1 Case where user-specific information is decoded within P80

FIG. 21 illustrates an example of a preamble puncturing pattern in 240 MHz and 320 MHz bands (Case 1)-1).

FIG. 21 illustrates a preamble puncturing pattern where CCA granularity is 20 MHz and user-specific information (repetition of A and B) is duplicated in units of 40 MHz and can be decoded in P80. That user-specific information can be decoded in P80 means that a preamble puncturing pattern is configured such that all of the user-specific information (here, A and B) can be decoded in P80. Referring to FIG. 21, in Case 1 to Case 3, the preamble puncturing pattern is configured such that all of the user-specific information (A and B) can be decoded within P80.

In FIG. 21, a shaded area denotes a punctureable (busy) channel, and "at least one" means that puncturing is performed in at least one 20 MHz channel among shaded channels. In addition, specific puncturing information on a channel after P160 may be additionally indicated in a PHY header (e.g., an RU allocation field of a SIG). When a transmitting STA transmits a preamble-punctured PPDU, CCA conditions for each bandwidth and each case are as follows.

<240 MHz>
Case 1: P20 is idle, S40, at least one of four 20 MHz subchannels of S80-1, and at least one of four 20 MHz subchannels of S80-2 are idle during a certain interval (e.g. PIFS or AIFS)
Case 2: P20 is idle, S40 and at least one of four 20 MHz subchannels of S80-2 are idle during a certain interval (e.g. PIFS or AIFS)
Case 3: P20 is idle, S20 and at least one of four 20 MHz subchannels of S80-2 are idle during a certain interval (e.g. PIFS or AIFS)
<320 MHz>
Case 1: P20 is idle, S40, at least one of four 20 MHz subchannels of S80-1, and at least one of four 20 MHz subchannels of S80-3 are idle during a certain interval (e.g. PIFS or AIFS)
Case 2: P20 is idle, S40 and at least one of four 20 MHz subchannels of S80-3 are idle during a during a certain interval (e.g. PIFS or AIFS)
Case 3: P20 is idle, S20 and at least one of four 20 MHz subchannels of S80-3 are idle during a certain interval (e.g. PIFS or AIFS)

Figure 22:
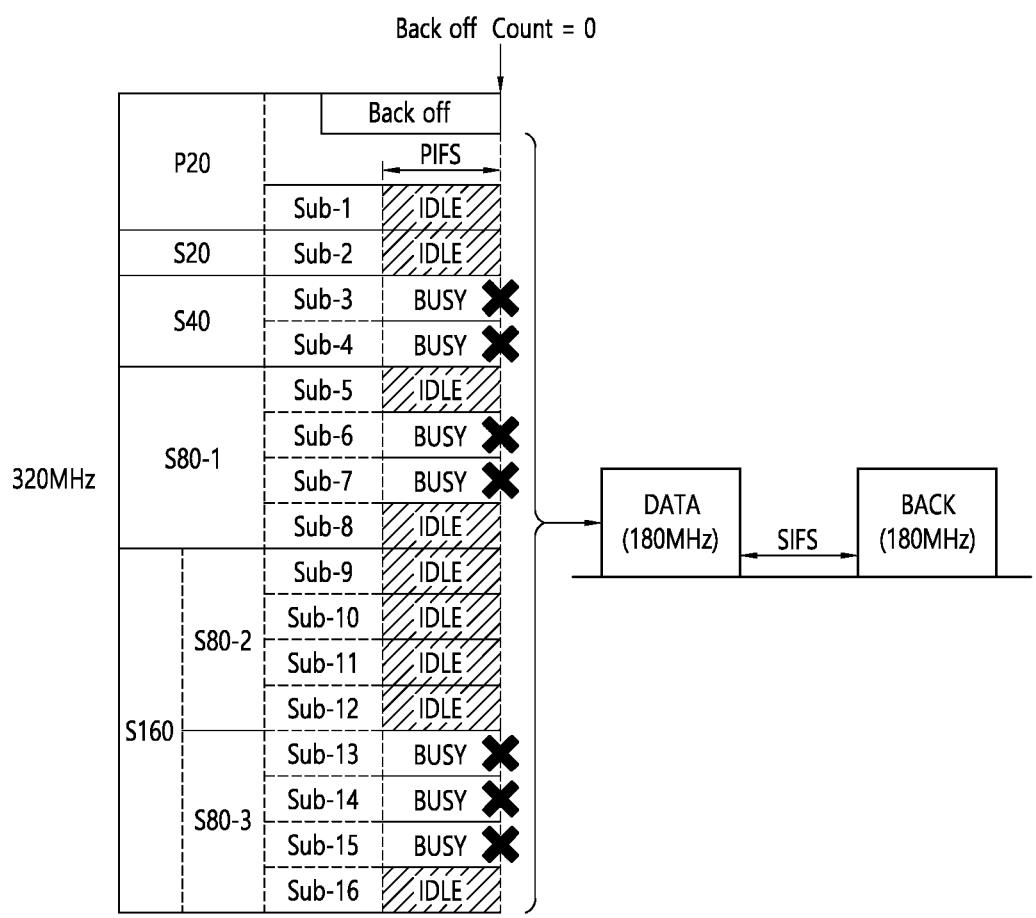
FIG. 22 illustrates an example of data transmission according to a preamble puncturing pattern in the 240 MHz and 320 MHz bands

FIG. 22 illustrates an example of data transmission according to a preamble puncturing pattern in the 240 MHz and 320 MHz bands.

Referring to FIG. 22, a transmitting STA may perform a backoff on P20 first and may determine whether channels of S20, S40, S80-1, S80-2, and S80-3 are idle/busy during PIFS before the moment when transmission is possible in P20 (backoff count=0) arrives, thereby determining a transmission bandwidth. That is, the transmitting STA may perform CCA on each channel and may then transmit data in the determined transmission bandwidth when the backoff count is 0.

FIG. 22 illustrates an example in which preamble puncturing is performed in S40 and S80-1 as in Case 3 of 1)-1, where 20 MHz channels corresponding to subchannels 3 and 4 of S40, subchannels 6 and 7 of S80, and subchannels 13 to 15 of S160 are busy, and thus the transmitting STA may perform preamble puncturing on these channels and may transmit a 320 MHz PPDU including data having a 180 MHz bandwidth.

1)-2 Case where User-Specific Information is Decoded within P160

Figure 23:
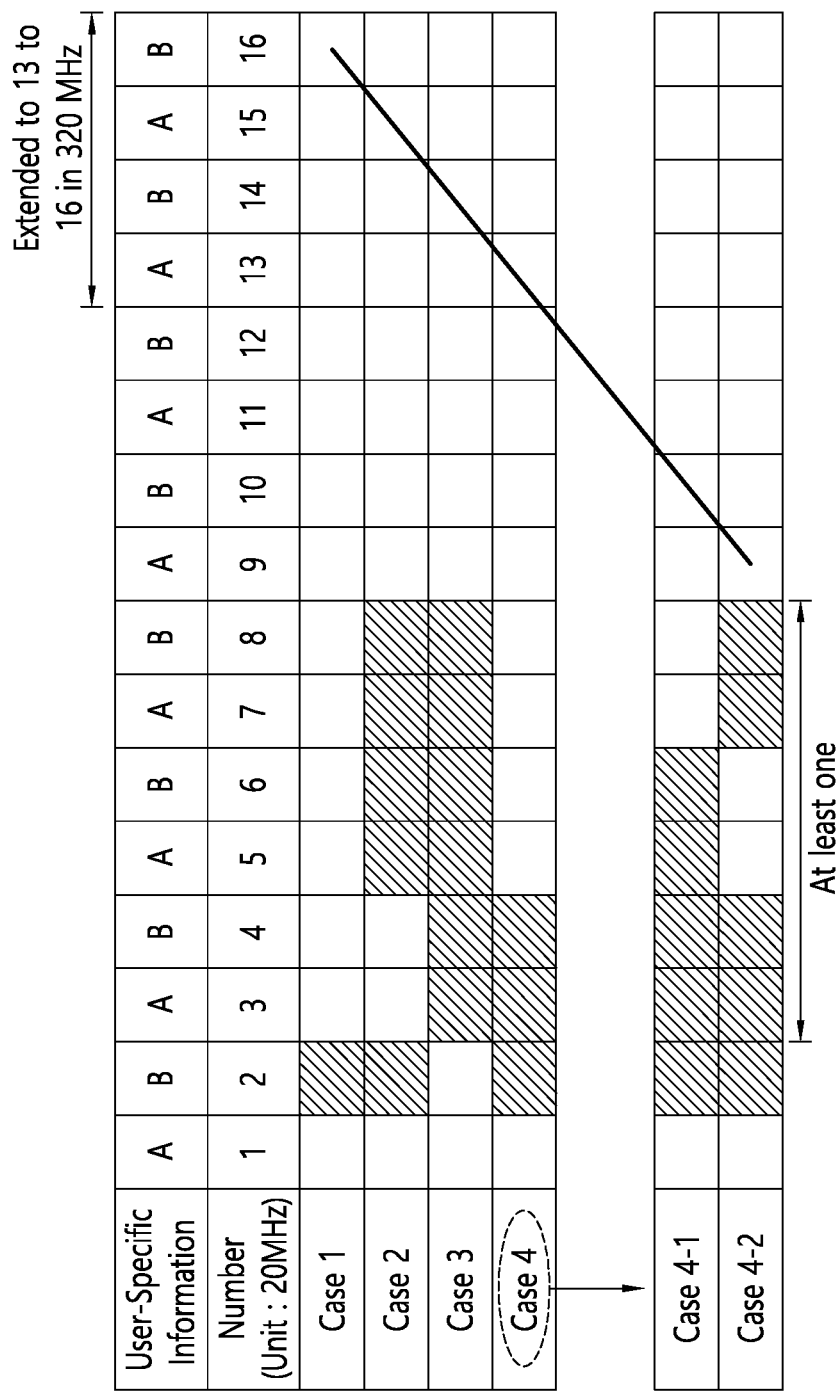
FIG. 23 illustrates another example of a preamble puncturing pattern in the 240 MHz and 320 MHz bands.

FIG. 23 illustrates another example of a preamble puncturing pattern in the 240 MHz and 320 MHz bands (Case 1)-2).

FIG. 23 illustrates a preamble puncturing pattern where CCA granularity is 20 MHz and user-specific information (repetition of A and B) is duplicated in units of 40 MHz and can be decoded in P160. Since a decoding range is increased to P160 compared to 1)-1, a case is added. That user-specific information can be decoded in P160 means that a preamble puncturing pattern is configured such that all of the user-specific information (here, A and B) can be decoded in P160. Referring to FIG. 23, in Case 1 to Case 4, the preamble puncturing pattern is configured such that all of the user-specific information (A and B) can be decoded within P160.

In FIG. 23, a shaded area denotes a channel in which preamble puncturing is possible (which is busy) channel, and "at least one" means that puncturing is performed in at least one 20 MHz channel among shaded channels. In addition, specific puncturing information on a channel after P160 may be additionally indicated in a PHY header (e.g., an RU allocation field of a SIG). In particular, since entire S80 is less likely to be idle in a dense environment, Case 4 may be divided into two cases, 4-1 and 4-2. When a transmitting STA transmits a preamble-punctured PPDU, CCA conditions for each bandwidth and each case are as follows.

<240 MHz>
Case 1: P20 is idle, S40, at least one of four 20 MHz subchannels of S80-1, and at least one of four 20 MHz subchannels of S80-2 are idle during a certain interval (e.g. PIFS or AIFS)
Case 2: P20 is idle, S40 and at least one of four 20 MHz subchannels of S80-2 are idle during a certain interval (e.g. PIFS or AIFS)
Case 3: P20 is idle, S20 and at least one of four 20 MHz subchannels of S80-2 are idle during a certain interval (e.g. PIFS or AIFS)
Case 4: P20 is idle, At least one of four 20 MHz subchannels of S80-1 and at least one of four 20 MHz subchannels of S80-2 are idle during a certain interval (e.g. PIFS or AIFS)
Case 4-1: P20 is idle, Right 40 MHz (7 and 8) of S80-1 and at least one of four 20 MHz subchannels of S80-2 are idle during a certain interval (e.g. PIFS or AIFS)
Case 4-2: P20 is idle, Left 40 MHz (5 and 6) of S80-1 and at least one of four 20 MHz subchannels of S80-2 are idle during a certain interval (e.g. PIFS or AIFS)
<320 MHz>
Case 1: P20 is idle, S40, at least one of four 20 MHz subchannels of S80-1, and at least one of four 20 MHz subchannels of S80-3 are idle during a certain interval (e.g. PIFS or AIFS)
Case 2: P20 is idle, S40 and at least one of four 20 MHz subchannels of S80-3 are idle during a during a certain interval (e.g. PIFS or AIFS)
Case 3: P20 is idle, S20 and at least one of four 20 MHz subchannels of S80-3 are idle during a certain interval (e.g. PIFS or AIFS)

Case 4: P20 is idle, At least one of four 20 MHz subchannels of S80-1 and at least one of four 20 MHz subchannels of S80-3 are idle during a certain interval (e.g. PIFS or AIFS)

Case 4-1: P20 is idle, Right 40 MHz (7 and 8) of S80-1 and at least one of four 20 MHz subchannels of S80-3 are idle during a certain interval (e.g. PIFS or AIFS)

Case 4-2: P20 is idle, Left 40 MHz (5 and 6) of S80-1 and at least one of four 20 MHz subchannels of S80-3 are idle during a certain interval (e.g. PIFS or AIFS)

Figure 24:
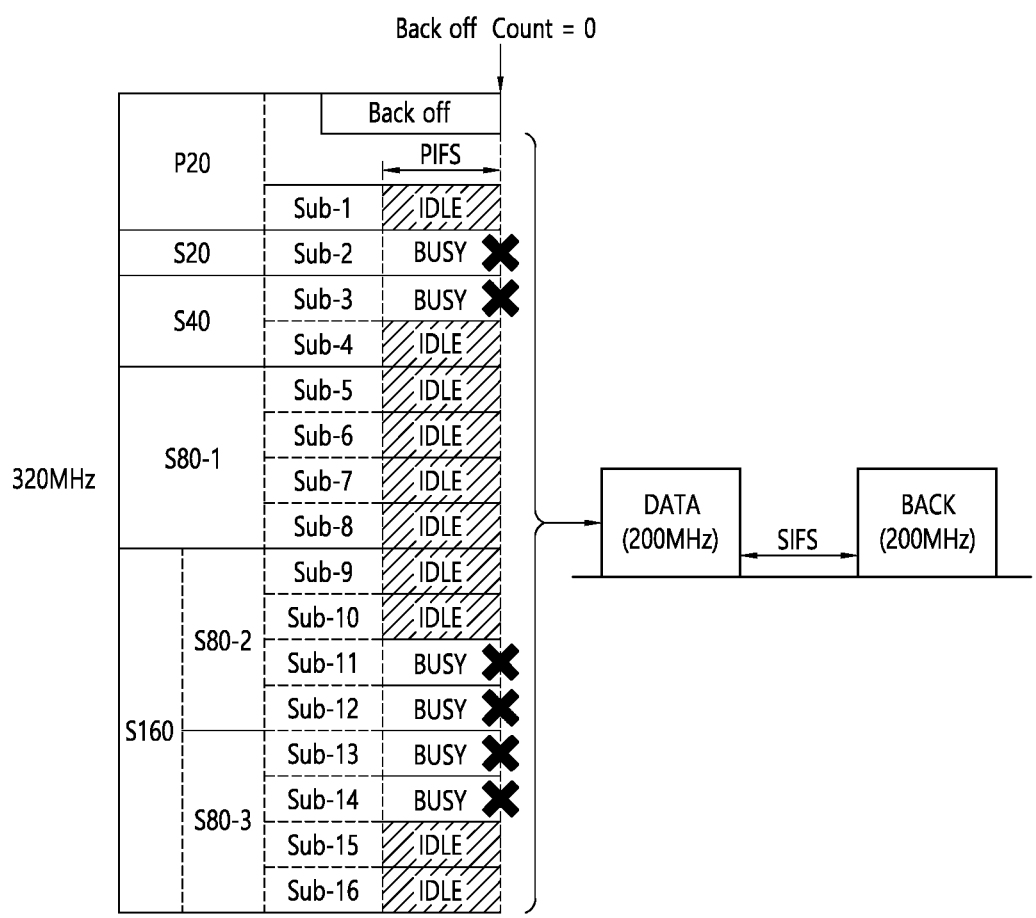
FIG. 24 illustrates another example of data transmission according to a preamble puncturing pattern in the 240 MHz and 320 MHz bands.

FIG. 24 illustrates another example of data transmission according to a preamble puncturing pattern in the 240 MHz and 320 MHz bands.

Referring to FIG. 24, a transmitting STA may perform a backoff on P20 first and may determine whether channels of S20, S40, S80-1, S80-2, and S80-3 are idle/busy during PIFS before the moment when transmission is possible in P20 (backoff count=0) arrives, thereby determining a transmission bandwidth. That is, the transmitting STA may perform CCA on each channel and may then transmit data in the determined transmission bandwidth when the backoff count is 0.

FIG. 24 illustrates an example in which preamble puncturing is performed in S20 and S40 as in Case 4 of 1)-2, where 20 MHz channels corresponding to S20, subchannel 3 of S40, and subchannels 11 to 14 of S160 are busy, and thus the transmitting STA may perform preamble puncturing on these channels and may transmit a 320 MHz PPDU including data having a 200 MHz bandwidth.

2) 240/320 MHz, CCA granularity: 20 MHz, User-specific information: Duplicated in units of 80 MHz FIG. 25 illustrates still another example of a preamble puncturing pattern in the 240 MHz and 320 MHz bands (Case 2)).

FIG. 25 illustrates a preamble puncturing pattern that is possible where CCA granularity is 20 MHz and user-specific information (repetition of A, B, C, and D) is duplicated in units of 80 MHz. In FIG. 25, a shaded area denotes a punctureable (busy) channel, and "at least one" means that puncturing is performed in at least one 20 MHz channel among puncturable channels in S80 (shaded areas in 5 to 8). In addition, specific puncturing information on a channel after P160 may be additionally indicated in a PHY header (e.g., an RU allocation field of an 11 ax SIG-B). Since there are a greater number of channels for decoding the user-specific information than that in the foregoing method 1), complexity is increased and cases are added. When a transmitting STA transmits a preamble-punctured PPDU, CCA conditions for each bandwidth and each case are as follows.

<240 MHz>

Case 1: P20 is idle, Channels 3, 4 and 6, and at least one of four 20 MHz subchannels of S80-2 are idle during a certain interval (e.g. PIFS or AIFS)

Case 2: P20 is idle, Channels 2, 4 and 7, and at least one of four 20 MHz subchannels of S80-2 are idle during a certain interval (e.g. PIFS or AIFS)

Case 3: P20 is idle, Channels 2, 3 and 8, and at least one of four 20 MHz subchannels of S80-2 are idle during a certain interval (e.g. PIFS or AIFS)

Case 4: P20 is idle, Channels 4, 6 and 7, and at least one of four 20 MHz subchannels of S80-2 are idle during a certain interval (e.g. PIFS or AIFS)

Case 5: P20 is idle, Channels 2, 7 and 8, and at least one of four 20 MHz subchannels of S80-2 are idle during a certain interval (e.g. PIFS or AIFS)

Case 6: P20 is idle, Channels 3, 6 and 8, and at least one of four 20 MHz subchannels of S80-2 are idle during a certain interval (e.g. PIFS or AIFS)

Case 7: P20 is idle, Channels 6, 7 and 8, and at least one of four 20 MHz subchannels of S80-2 are idle during a certain interval (e.g. PIFS or AIFS)

Case 8: P20 is idle, S20, S40, and at least one of four 20 MHz subchannels of S80-2 are idle during a certain interval (e.g. PIFS or AIFS)

<320 MHz>

Case 1: P20 is idle, Channels 3, 4 and 6, and at least one of four 20 MHz subchannels of S80-3 are idle during a certain interval (e.g. PIFS or AIFS)

Case 2: P20 is idle, Channels 2, 4 and 7, and at least one of four 20 MHz subchannels of S80-3 are idle during a certain interval (e.g. PIFS or AIFS)

Case 3: P20 is idle, Channels 2, 3 and 8, and at least one of four 20 MHz subchannels of S80-3 are idle during a certain interval (e.g. PIFS or AIFS)

Case 4: P20 is idle, Channels 4, 6 and 7, and at least one of four 20 MHz subchannels of S80-3 are idle during a certain interval (e.g. PIFS or AIFS)

Case 5: P20 is idle, Channels 2, 7 and 8, and at least one of four 20 MHz subchannels of S80-3 are idle during a certain interval (e.g. PIFS or AIFS)

Case 6: P20 is idle, Channels 3, 6 and 8, and at least one of four 20 MHz subchannels of S80-3 are idle during a certain interval (e.g. PIFS or AIFS)

Case 7: P20 is idle, Channels 6, 7 and 8, and at least one of four 20 MHz subchannels of S80-3 are idle during a certain interval (e.g. PIFS or AIFS)

Case 8: P20 is idle, S20, S40, and at least one of four 20 MHz subchannels of S80-3 are idle during a certain interval (e.g. PIFS or AIFS)

FIG. 26 illustrates still another example of data transmission according to a preamble puncturing pattern in the 240 MHz and 320 MHz bands.

FIG. 26 illustrates an example in which preamble puncturing is performed in Case 4 of 2), where 20 MHz channels corresponding to S20, subchannel 3 of S40, subchannel 8 of S80-1, and subchannels 11, 12, 15, and 16 of S160 are busy, and thus the transmitting STA may perform preamble puncturing on these channels and may transmit a 320 MHz PPDU including data having a 160 MHz bandwidth. Here, a receiving STA may identify all user-specific information through P20, subchannel 4 of S40, and subchannels 6 and 7 of S80, which are idle channels. Referring to FIG. 25, in Case 4, the receiving STA may identify A through P20, may identify D through subchannel 4 of S40, and may identify B and C through subchannels 6 and 7 of S80.

3) 240/320 MHz, CCA granularity: 40 MHz, User-specific information: Duplicated in units of 40 MHz FIG. 27 illustrates yet another example of a preamble puncturing pattern in the 240 MHz and 320 MHz bands (Case 3)).

FIG. 27 illustrates a preamble puncturing pattern that is possible where CCA granularity is 40 MHz and user-specific information (repetition of A and B) is duplicated in units of 40 MHz. In FIG. 27, a shaded area denotes a punctureable (busy) channel, and "at least one" means that puncturing is performed in at least one 40 MHz channel among puncturable channels in S40+S80-1 (shaded areas in 2 to 4). In addition, specific puncturing information on a channel after P160 may be additionally indicated in a PHY header (e.g., an RU allocation field of an 11ax SIG-B). Since the CCA granularity is higher than that in the foregoing method 1), overheads for the PHY header are reduced. When a transmitting STA transmits a preamble-punctured PPDU, CCA conditions for each bandwidth and each case are as follows.

"Granularity of 40 MHz" may mean that CCA is performed in units of 40 MHz or that CCA is performed in conventional units of 20 MHz but the result of the CCA is based on 40 MHz. For example, "idle P40" may mean 1) that entire P40 is idle after a backoff or 2) that P20 is idle and S20 is idle during a certain interval (e.g. PIFS or AIFS).

<240 MHz>
Case 1: P40 is idle, At least one of two 40 MHz subchannels of S80-2 is idle during a certain interval (e.g. PIFS or AIFS)

<320 MHz>
Case 1: P40 is idle, At least one of two 40 MHz subchannels of S80-3 is idle during a certain interval (e.g. PIFS or AIFS)

Figure 28:
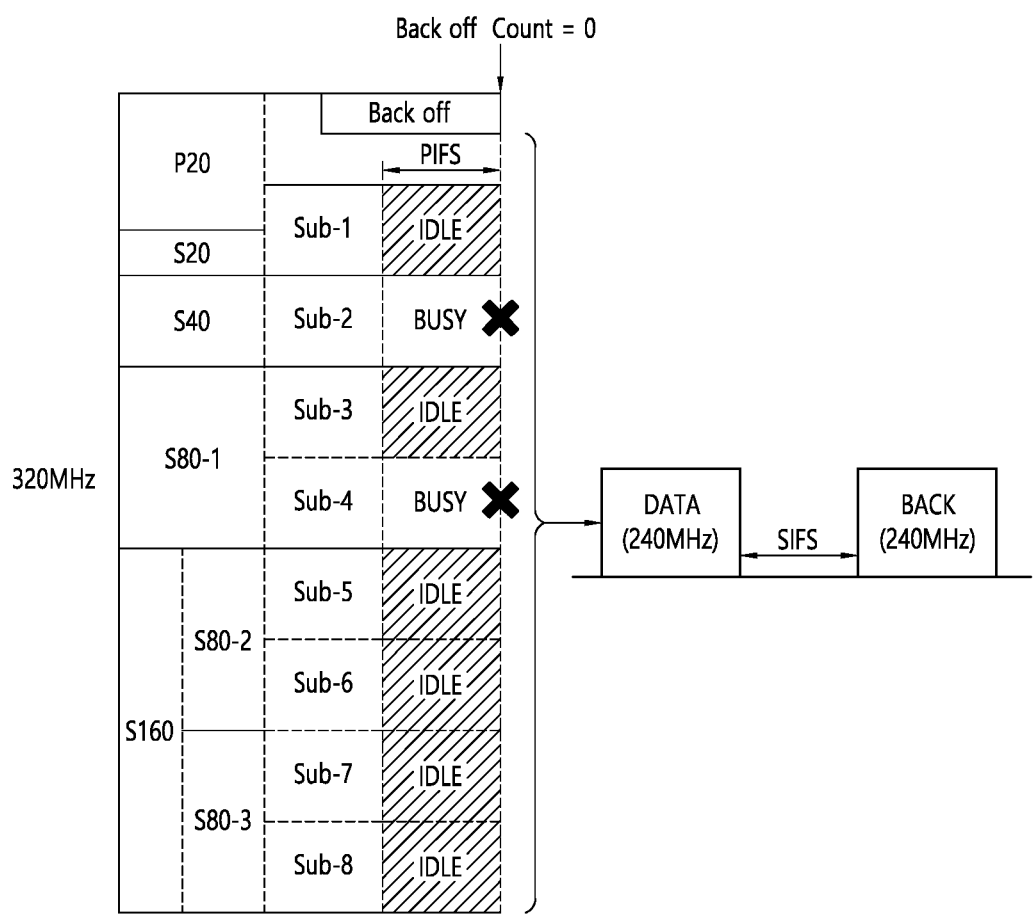
FIG. 28 illustrates yet another example of data transmission according to a preamble puncturing pattern in the 240 MHz and 320 MHz bands.

FIG. 28 illustrates yet another example of data transmission according to a preamble puncturing pattern in the 240 MHz and 320 MHz bands.

Referring to FIG. 28, a transmitting STA may perform a backoff on P20 first and may determine whether channels of S20, S40, S80-1, S80-2, and S80-3 are idle/busy during PIFS before the moment when transmission is possible in P20 (backoff count=0) arrives, thereby determining a transmission bandwidth. That is, the transmitting STA may perform CCA on each channel and may then transmit data in the determined transmission bandwidth when the backoff count is 0.

FIG. 28 illustrates an example in which preamble puncturing is performed in Case 1 of 3), where 40 MHz channels corresponding to S40 (subchannel 2) and subchannel 4 of S80-1 are busy, and thus the transmitting STA may perform preamble puncturing on these channels and may transmit a 320 MHz PPDU including data having a 240 MHz bandwidth. Here, a STA may identify all user-specific information through P40, which is an idle channel. Referring to FIG. 27, in Case 1, the receiving STA may identify A and B through P40.

4) 240/320 MHz, CCA granularity: 40 MHz, User-specific information: Duplicated in units of 80 MHz FIG. 29 illustrates still another example of a preamble puncturing pattern in the 240 MHz and 320 MHz bands (Case 4)).

FIG. 29 illustrates a preamble puncturing pattern that is possible where CCA granularity is 40 MHz and user-specific information (repetition of A, B, C, and D) is duplicated in units of 80 MHz. In FIG. 29, a shaded area denotes a punctureable (busy) channel, and "at least one" means that puncturing is performed in at least one 40 MHz channel among puncturable channels. In addition, specific puncturing information on a channel after P160 may be additionally indicated in a PHY header (e.g., an RU allocation field of an 11ax SIG-B). Since the CCA granularity is higher than that in the foregoing method 2), overheads for the PHY header are reduced. When a transmitting STA transmits a preamble-punctured PPDU, CCA conditions for each bandwidth and each case are as follows.

<240 MHz>
Case 1: P40 is idle, Channel 4 and at least one of two 40 MHz subchannels of S80-2 are idle during a certain interval (e.g. PIFS or AIFS)
Case 2: P40 is idle, S40 (channel 2) and at least one of two 40 MHz subchannels of S80-2 are idle during a certain interval (e.g. PIFS or AIFS)

<320 MHz>
Case 1: P40 is idle, Channel 4 and at least one of two 40 MHz subchannels of S80-3 are idle during a certain interval (e.g. PIFS or AIFS)
Case 2: P40 is idle, S40 (channel 2) and at least one of two 40 MHz subchannels of S80-3 are idle during a certain interval (e.g. PIFS or AIFS)

Figure 30:
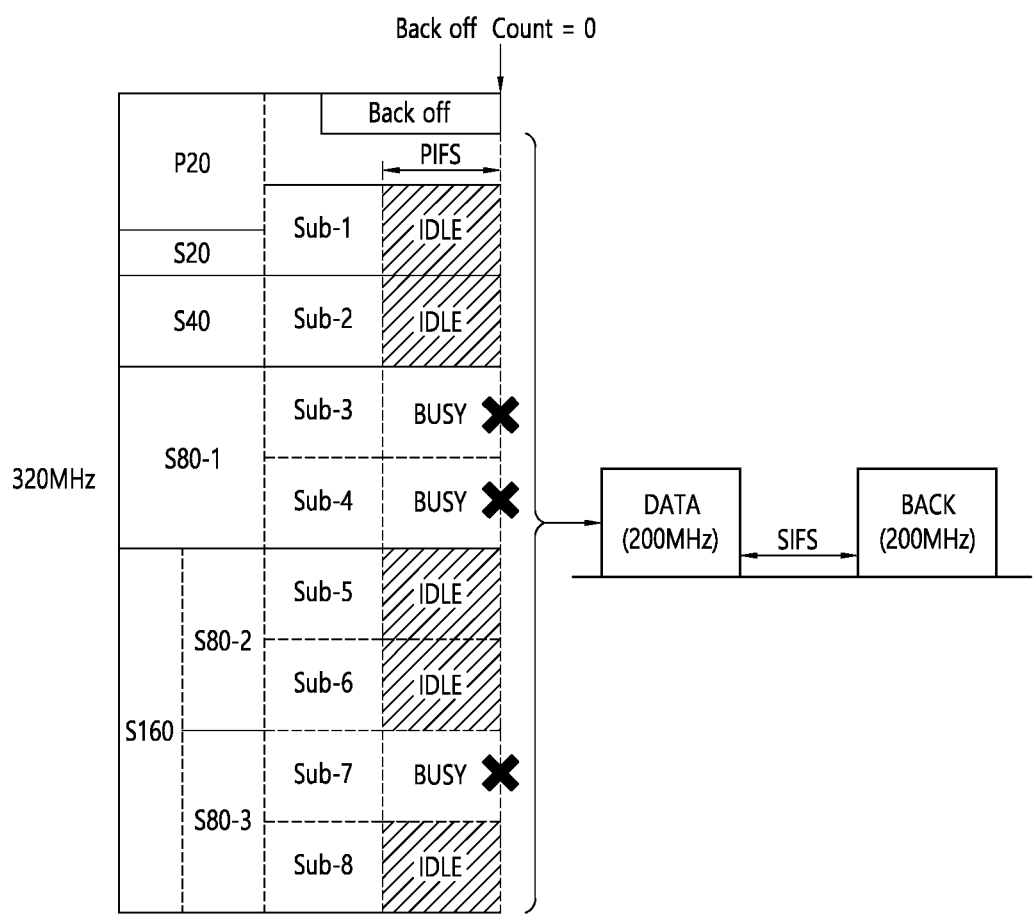
FIG. 30 illustrates still another example of data transmission according to a preamble puncturing pattern in the 240 MHz and 320 MHz bands.

FIG. 30 illustrates still another example of data transmission according to a preamble puncturing pattern in the 240 MHz and 320 MHz bands.

Referring to FIG. 30, a transmitting STA may perform a backoff on P20 first and may determine whether channels of S20, S40, S80-1, S80-2, and S80-3 are idle/busy during PIFS before the moment when transmission is possible in P20 (backoff count=0) arrives, thereby determining a transmission bandwidth. That is, the transmitting STA may perform CCA on each channel and may then transmit data in the determined transmission bandwidth when the backoff count is 0.

FIG. 30 illustrates an example in which preamble puncturing is performed in Case 2 of 4), where 40 MHz channels corresponding to subchannels 3 and 4 of S80-1 and subchannel 7 of S160 are busy, and thus the transmitting STA may perform preamble puncturing on these channels and may transmit a 320 MHz PPDU including data having a 200 MHz bandwidth. Here, a receiving STA may identify all user-specific information through P80, which is an idle channel. Referring to FIG. 29, in Case 2, the receiving STA may identify A, B, C, and D through P80.

5) 240/320 MHz, CCA granularity: 80 MHz, User-specific information: Duplicated in units of 40 MHz FIG. 31 illustrates yet another example of a preamble puncturing pattern in the 240 MHz and 320 MHz bands (Case 5)).

FIG. 31 illustrates a preamble puncturing pattern that is possible where CCA granularity is 80 MHz and user-specific information (repetition of A and B) is duplicated in units of 40 MHz. In FIG. 31, a shaded area denotes a punctureable (busy) channel. Specific puncturing information on a channel after P160 may be additionally indicated in a PHY header (e.g., an RU allocation field of an 11ax SIG-B). Since the CCA granularity is higher than that in the foregoing method 1), overheads for the PHY header are reduced. When a transmitting STA transmits a preamble-punctured PPDU, CCA conditions for each bandwidth and each case are as follows.

"Granularity of 80 MHz" may mean that CCA is performed in units of 80 MHz or that CCA is performed in conventional units of 20 MHz but the result of the CCA is based on 80 MHz. For example, "idle P80" may mean 1) that entire P80 is idle after a backoff or 2) that P20 is idle and S20 and S40 are idle during a certain interval (e.g. PIFS or AIFS).

<240 MHz>
Case 1: P80 is idle, S80-2 (80 MHz) is idle during a certain interval (e.g. PIFS or AIFS)

<320 MHz>
Case 1: P80 is idle, S80-3 (80 MHz) is idle during a certain interval (e.g. PIFS or AIFS)

6) 240/320 MHz, CCA granularity: 80 MHz, User-specific information: Duplicated in units of 80 MHz FIG. 32 illustrates still another example of a preamble puncturing pattern in the 240 MHz and 320 MHz bands (Case 6)).

FIG. 32 illustrates a preamble puncturing pattern that is possible where CCA granularity is 80 MHz and user-specific information (repetition of A, B, C, and D) is duplicated in units of 80 MHz. In FIG. 32, a shaded area denotes a punctureable (busy) channel. Specific puncturing information on a channel after P160 may be additionally indicated in a PHY header (e.g., an RU allocation field of an 11ax SIG-B). Since the CCA granularity is higher than that in the foregoing method 2), overheads for the PHY header are reduced. When a transmitting STA transmits a preamble-punctured PPDU, CCA conditions for each bandwidth and each case are as follows.

"Granularity of 80 MHz" may mean that CCA is performed in units of 80 MHz or that CCA is performed in conventional units of 20 MHz but the result of the CCA is based on 80 MHz. For example, "idle P80" may mean 1) that entire P80 is idle after a backoff or 2) that P20 is idle and S20 and S40 are idle during a certain interval (e.g. PIFS or AIFS).

<240 MHz>

Case 1: P80 is idle, S80-2 (80 MHz) is idle during a certain interval (e.g. PIFS or AIFS)

<320 MHz>

Case 1: P80 is idle, S80-3 (80 MHz) is idle during a certain interval (e.g. PIFS or AIFS)

Figure 33:
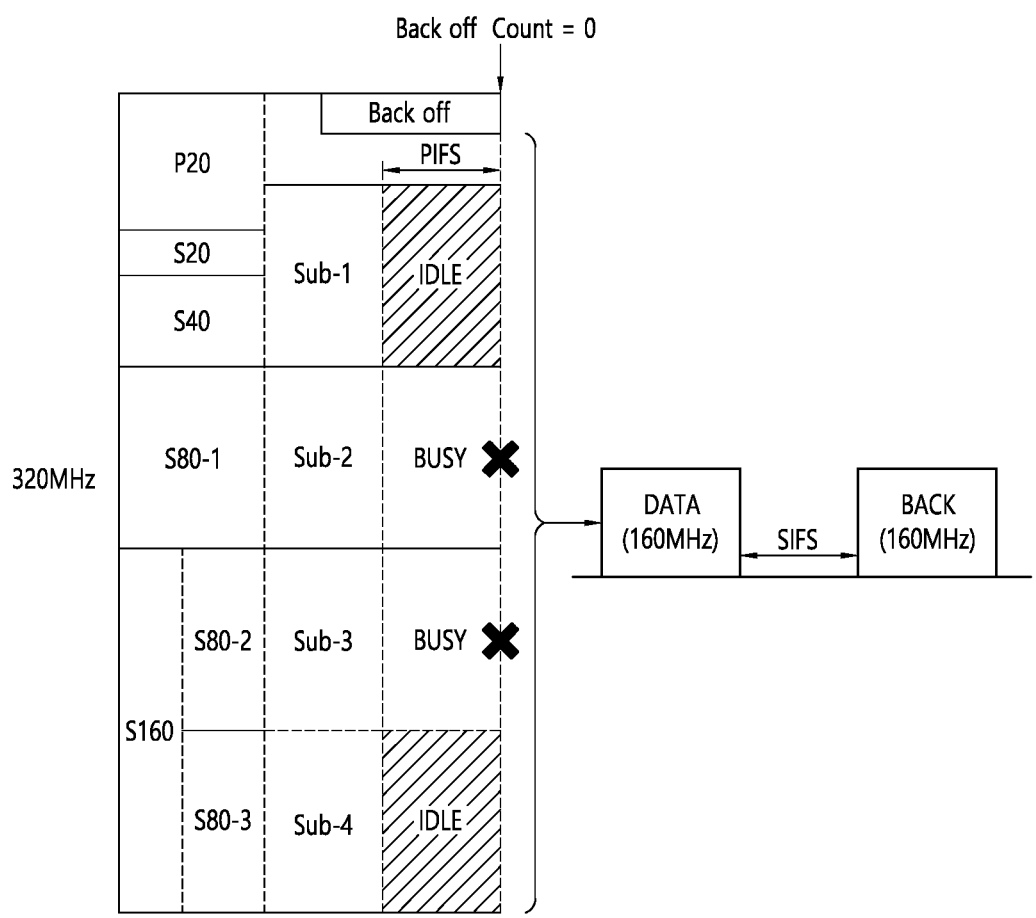
FIG. 33 illustrates yet another example of data transmission according to a preamble puncturing pattern in the 240 MHz and 320 MHz bands.

FIG. 33 illustrates yet another example of data transmission according to a preamble puncturing pattern in the 240 MHz and 320 MHz bands.

Referring to FIG. 33, a transmitting STA may perform a backoff on P20 first and may determine whether channels of S20, S40, S80-1, S80-2, and S80-3 are idle/busy during PIFS before the moment when transmission is possible in P20 (backoff count=0) arrives, thereby determining a transmission bandwidth. That is, the transmitting STA may perform CCA on each channel and may then transmit data in the determined transmission bandwidth when the backoff count is 0.

FIG. 33 illustrates an example in which preamble puncturing is performed in 5) and 6), where 80 MHz channels corresponding to S80 and subchannel 3 of S160 are busy, and thus the transmitting STA may perform preamble puncturing on these channels and may transmit a 320 MHz PPDU including data having a 200 MHz bandwidth. Here, a receiving STA may identify all user-specific information through P80, which is an idle channel. Referring to FIG. 32, in Case 1, the receiving STA may identify A, B, C, and D through P80.

Hereinafter, the foregoing embodiments will be described with reference to FIG. 18 to FIG. 33.

Figure 34:
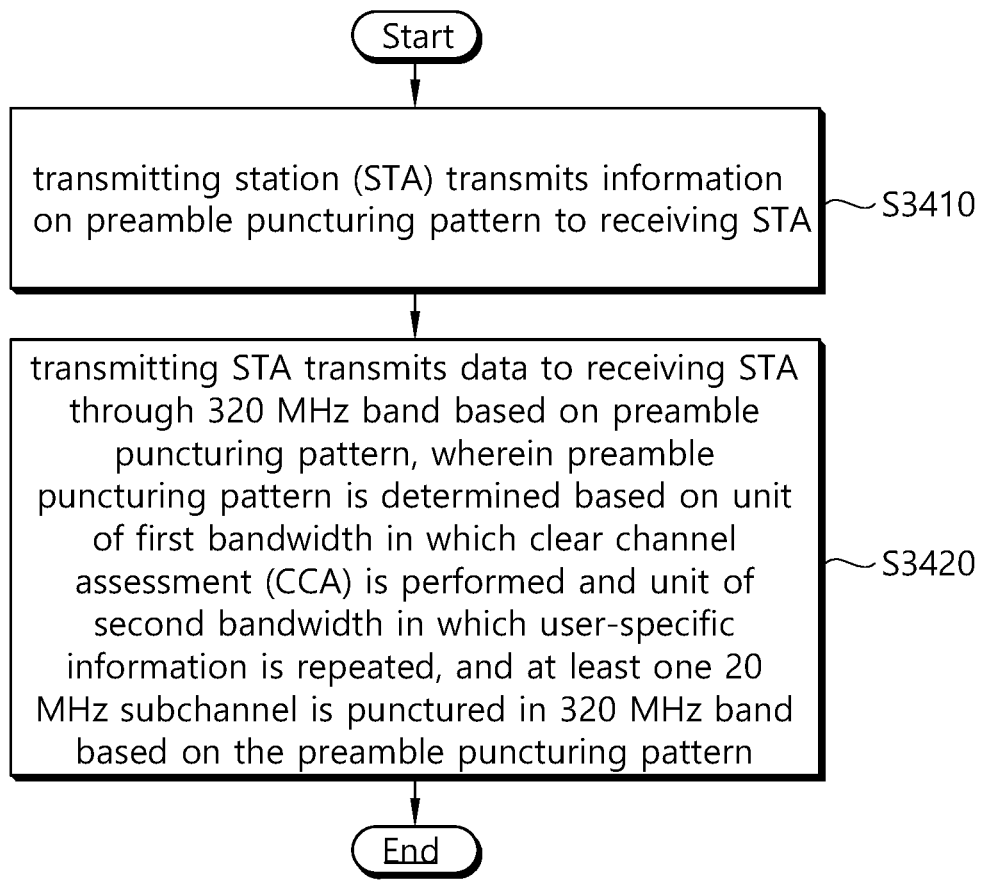
FIG. 34 is a flowchart illustrating a process in which a transmitting STA transmits data according to an embodiment.

FIG. 34 is a flowchart illustrating a process in which a transmitting STA transmits data according to an embodiment.

The embodiment of FIG. 34 may be performed in a network environment supporting a next-generation WLAN system. The next-generation WLAN system may be a WLAN system evolving from an 802.11ax system and may satisfy backward compatibility with the 802.11ax system.

The embodiment of FIG. 34 may be performed by a transmitting station (STA), and the transmitting STA may correspond to an access point (AP). A receiving STA of FIG. 34 may correspond to a STA supporting an extremely high throughput (EHT) WLAN system.

In operation S3410, the transmitting STA transmits information on a preamble puncturing pattern to the receiving STA.

In operation S3420, the transmitting STA transmits data to the receiving STA through a 320 MHz band based on the preamble puncturing pattern.

The preamble puncturing pattern is determined based on a unit of a first bandwidth in which clear channel assessment (CCA) is performed and a unit of a second bandwidth in which user-specific information is repeated. That is, the transmitting STA may determine the preamble puncturing pattern so that the receiving STA can decode all the user-specific information.

For example, the user-specific information may include first information and second information, and the first information and the second information may be repeated in units of the second bandwidth. Here, the unit of the first bandwidth may be 20 MHz, and the unit of the second bandwidth may be 40 MHz. Each of the first information and the second information may be allocated in units of 20 MHz.

In another example, the user-specific information may include first to fourth information, and the first to fourth information may be repeated in units of the second bandwidth. Here, the unit of the first bandwidth may be 20 MHz, and the unit of the second bandwidth may be 80 MHz. Each of the first to fourth information may be allocated in units of 20 MHz. In addition, the unit of the first bandwidth may be 40 MHz or 80 MHz.

The preamble puncturing pattern may be determined such that all of the user-specific information can be decoded within a primary 80 MHz. That is, the preamble puncturing pattern may be determined such that the first information and the second information can be decoded within the primary 80 MHz.

Further, the preamble puncturing pattern may be determined such that all of the user-specific information can be decoded within a primary 160 MHz. That is, the preamble puncturing pattern may be determined such that the first information and the second information can be decoded within the primary 160 MHz.

The 320 MHz band may include a primary 20 MHz, a secondary 20 MHz, a secondary 40 MHz, a first secondary 80 MHz, a second secondary 80 MHz, and a third secondary 80 MHz.

The primary 20 MHz may include one 20 MHz subchannel, and the secondary 20 MHz may include one 20 MHz subchannel. The secondary 40 MHz may include two 20 MHz subchannels. The first secondary 80 MHz may include four 20 MHz subchannels, the second secondary 80 MHz may include four 20 MHz subchannels, and the third secondary 80 MHz may include four 20 MHz subchannels. That is, the 320 MHz band may include a total of 16 20 MHz subchannels.

For example, the information on the preamble puncturing pattern may include CCA information on the primary 20 MHz, the secondary 20 MHz, and the third secondary 80 MHz.

Based on the CCA information, the primary 20 MHz may be determined to be idle, the secondary 20 MHz may be determined to be idle, and at least one 20 MHz subchannel among the four 20 MHz subchannels of the third secondary 80 MHz may be determined to be idle. Accordingly, the preamble puncturing pattern may be determined such that the first information and the second information can be decoded within the primary 80 MHz (or 160 MHz), because the first information can be decoded in the primary 20 MHz, and the second information can be decoded in the secondary 20 MHz.

In another example, the information on the preamble puncturing pattern may include CCA information on the primary 20 MHz, the secondary 40 MHz, the first secondary 80 MHz, and the second secondary 80 MHz.

Based on the CCA information, the primary 20 MHz may be determined to be idle, the secondary 40 MHz may be determined to be idle, and at least one 20 MHz subchannel among the four 20 MHz subchannels of the first secondary 80 MHz and the second secondary 80 MHz may be determined to be idle. Likewise, the preamble puncturing pattern may be determined such that the first information and the second information can be decoded within the primary 80 MHz (or 160 MHz), because the first information can be decoded in the primary 20 MHz, and the second information can be decoded in the secondary 40 MHz.

In still another example, the information on the preamble puncturing pattern may include CCA information on the primary 20 MHz, the secondary 40 MHz, and the second secondary 80 MHz.

Based on the CCA information, the primary 20 MHz may be determined to be idle, the secondary 40 MHz may be determined to be idle, and at least one 20 MHz subchannel among the four 20 MHz subchannels of the second secondary 80 MHz may be determined to be idle. Likewise, the preamble puncturing pattern may be determined such that the first information and the second information can be decoded within the primary 80 MHz (or 160 MHz), because the first information can be decoded in the primary 20 MHz, and the second information can be decoded in the secondary 40 MHz.

Among the total of 16 20 MHz subchannels in the 320 MHz band, all or some remaining 20 MHz subchannels excluding a 20 MHz subchannel determined to be idle based on the CCA information may be determined to be busy.

At least one 20 MHz subchannel is punctured based on the preamble puncturing pattern in the 320 MHz band. The at least one 20 MHz subchannel may be included in the remaining 20 MHz subchannels.

The at least one 20 MHz subchannel may be determined to be busy. The at least one 20 M Hz subchannel may be included in the secondary 40 MHz, the first secondary 80 MHz, the second secondary 80 MHz, and the third secondary 80 MHz.

That is, the transmitting STA may puncture a 20 MHz subchannel determined to be busy in a wide bandwidth, such as the secondary 40 MHz, the first secondary 80 MHz, or the secondary 160 MHz (the second secondary 80 MHz and the third secondary 80 MHz), and may transmit data using remaining bands that are not punctured, thereby increasing channel and resource efficiency.

The data may be transmitted through an extremely high throughput (EHT) physical protocol data unit (PPDU). The EHT PPDU may be a PPDU supporting an EHT WLAN system or an 802.11be WLAN system. The EHT PPDU may include an EHT-Signal (SIG)-A field and an EHT-SIG-B field.

The information on the preamble puncturing pattern may be included in the EHT-SIG-A field.

The EHT-SIG-B field may include allocation information on a resource unit (RU) in which the at least one 20 MHz subchannel is punctured in the 320 MHz band.

The transmitting STA may receive a block acknowledgement (BA) of the data. The data may be transmitted through the RU, and the BA may be received through the RU. That is, the BA may be received through the same channel as that through which the data is transmitted. In this case, the RU may correspond to the remaining bands that are not punctured in the 320 MHz band.

Figure 35:
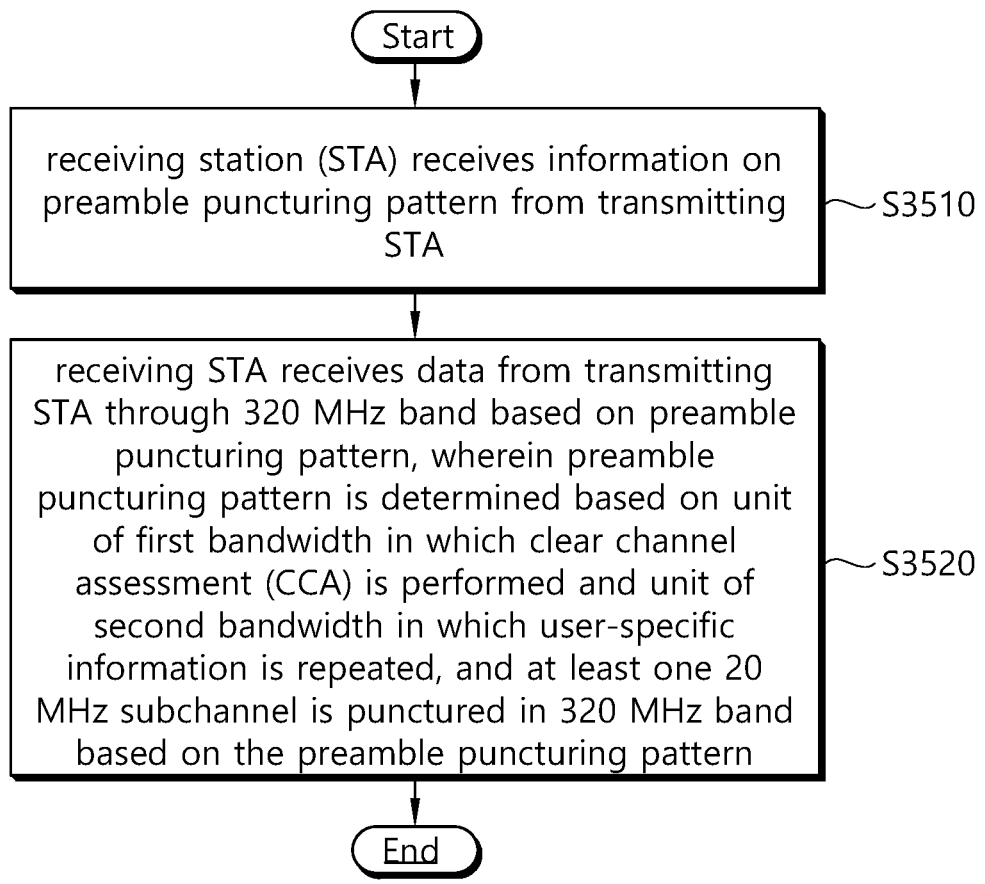
FIG. 35 is a flowchart illustrating a process in which a receiving STA receives data according to an embodiment.

FIG. 35 is a flowchart illustrating a process in which a receiving STA receives data according to an embodiment.

The embodiment of FIG. 35 may be performed in a network environment supporting a next-generation WLAN system. The next-generation WLAN system may be a WLAN system evolving from an 802.11ax system and may satisfy backward compatibility with the 802.11ax system.

The embodiment of FIG. 35 may be performed by a receiving station (STA) and may correspond to a STA supporting an extremely high throughput (EHT) WLAN system. A transmitting STA of FIG. 35 may correspond to an AP.

In operation S3510, the receiving STA receives information on a preamble puncturing pattern from the transmitting STA.

In operation S3520, the receiving STA receives data from the transmitting STA through a 320 MHz band based on the preamble puncturing pattern.

The preamble puncturing pattern is determined based on a unit of a first bandwidth in which clear channel assessment (CCA) is performed and a unit of a second bandwidth in which user-specific information is repeated. That is, the transmitting STA may determine the preamble puncturing pattern so that the receiving STA can decode all the user-specific information.

For example, the user-specific information may include first information and second information, and the first information and the second information may be repeated in units of the second bandwidth. Here, the unit of the first bandwidth may be 20 MHz, and the unit of the second bandwidth may be 40 MHz. Each of the first information and the second information may be allocated in units of 20 MHz.

In another example, the user-specific information may include first to fourth information, and the first to fourth information may be repeated in units of the second bandwidth. Here, the unit of the first bandwidth may be 20 MHz, and the unit of the second bandwidth may be 80 MHz. Each of the first to fourth information may be allocated in units of 20 MHz. In addition, the unit of the first bandwidth may be 40 MHz or 80 MHz.

The preamble puncturing pattern may be determined such that all of the user-specific information can be decoded within a primary 80 MHz. That is, the preamble puncturing pattern may be determined such that the first information and the second information can be decoded within the primary 80 MHz.

Further, the preamble puncturing pattern may be determined such that all of the user-specific information can be decoded within a primary 160 MHz. That is, the preamble puncturing pattern may be determined such that the first information and the second information can be decoded within the primary 160 MHz.

The 320 MHz band may include a primary 20 MHz, a secondary 20 MHz, a secondary 40 MHz, a first secondary 80 MHz, a second secondary 80 MHz, and a third secondary 80 MHz.

The primary 20 MHz may include one 20 MHz subchannel, and the secondary 20 MHz may include one 20 MHz subchannel. The secondary 40 MHz may include two 20 MHz subchannels. The first secondary 80 MHz may include four 20 MHz subchannels, the second secondary 80 MHz may include four 20 MHz subchannels, and the third secondary 80 MHz may include four 20 MHz subchannels. That is, the 320 MHz band may include a total of 16 20 MHz subchannels.

For example, the information on the preamble puncturing pattern may include CCA information on the primary 20 MHz, the secondary 20 MHz, and the third secondary 80 MHz.

Based on the CCA information, the primary 20 MHz may be determined to be idle, the secondary 20 MHz may be determined to be idle, and at least one 20 MHz subchannel among the four 20 MHz subchannels of the third secondary 80 MHz may be determined to be idle. Accordingly, the preamble puncturing pattern may be determined such that the first information and the second information can be decoded within the primary 80 MHz (or 160 MHz), because the first information can be decoded in the primary 20 MHz, and the second information can be decoded in the secondary 20 MHz.

In another example, the information on the preamble puncturing pattern may include CCA information on the primary 20 MHz, the secondary 40 MHz, the first secondary 80 MHz, and the second secondary 80 MHz.

Based on the CCA information, the primary 20 MHz may be determined to be idle, the secondary 40 MHz may be determined to be idle, and at least one 20 MHz subchannel among the four 20 MHz subchannels of each of the first secondary 80 MHz and the second secondary 80 MHz may be determined to be idle. Likewise, the preamble puncturing pattern may be determined such that the first information and the second information can be decoded within the primary 80 MHz (or 160 MHz), because the first information can be decoded in the primary 20 MHz, and the second information can be decoded in the secondary 40 MHz.

In still another example, the information on the preamble puncturing pattern may include CCA information on the primary 20 MHz, the secondary 40 MHz, and the second secondary 80 MHz.

Based on the CCA information, the primary 20 MHz may be determined to be idle, the secondary 40 MHz may be determined to be idle, and at least one 20 MHz subchannel among the four 20 MHz subchannels of the second secondary 80 MHz may be determined to be idle. Likewise, the preamble puncturing pattern may be determined such that the first information and the second information can be decoded within the primary 80 MHz (or 160 MHz), because the first information can be decoded in the primary 20 MHz, and the second information can be decoded in the secondary 40 MHz.

Among the total of 16 20 MHz subchannels in the 320 MHz band, all or some remaining 20 MHz subchannels excluding a 20 MHz subchannel determined to be idle based on the CCA information may be determined to be busy.

At least one 20 MHz subchannel is punctured based on the preamble puncturing pattern in the 320 MHz band. The at least one 20 MHz subchannel may be included in the remaining 20 MHz subchannels.

The at least one 20 MHz subchannel may be determined to be busy. The at least one 20 M Hz subchannel may be included in the secondary 40 MHz, the first secondary 80 MHz, the second secondary 80 MHz, and the third secondary 80 MHz.

That is, the transmitting STA may puncture a 20 MHz subchannel determined to be busy in a wide bandwidth, such as the secondary 40 MHz, the first secondary 80 MHz, or the secondary 160 MHz (the second secondary 80 MHz and the third secondary 80 MHz), and may transmit data using remaining bands that are not punctured, thereby increasing channel and resource efficiency.

The data may be transmitted through an extremely high throughput (EHT) physical protocol data unit (PPDU). The EHT PPDU may be a PPDU supporting an EHT WLAN system or an 802.11be WLAN system. The EHT PPDU may include an EHT-Signal (SIG)-A field and an EHT-SIG-B field.

The information on the preamble puncturing pattern may be included in the EHT-SIG-A field.

The EHT-SIG-B field may include allocation information on a resource unit (RU) in which the at least one 20 MHz subchannel is punctured in the 320 MHz band.

The transmitting STA may receive a block acknowledgement (BA) of the data. The data may be transmitted through the RU, and the BA may be received through the RU. That is, the BA may be received through the same channel as that through which the data is transmitted. In this case, the RU may correspond to the remaining bands that are not punctured in the 320 MHz band.

6. Device Configuration

Figure 36:
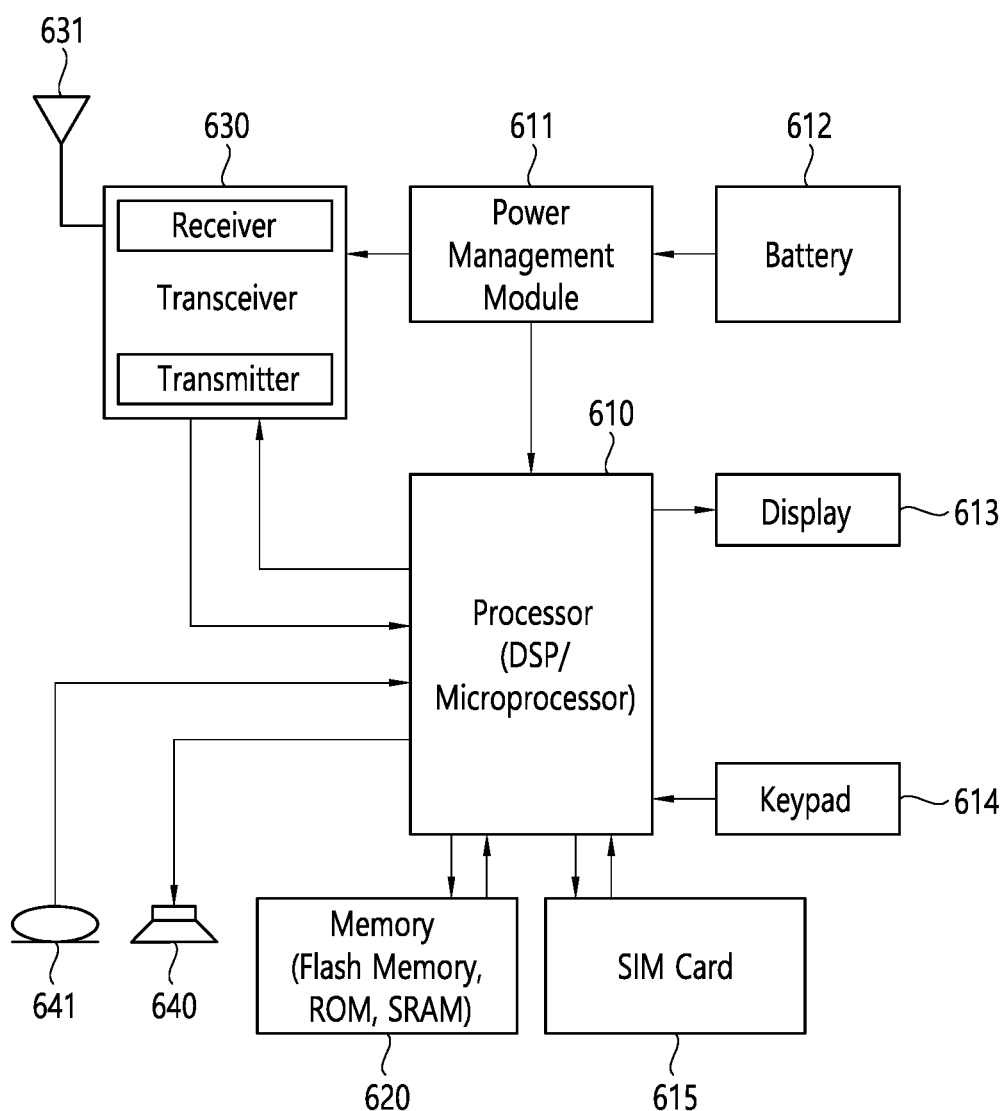
FIG. 36 illustrates a specific wireless device for implementing an embodiment of the present disclosure.

FIG. 36 illustrates a specific wireless device for implementing an embodiment of the present disclosure. The present disclosure described above with respect to a transmission device or a reception device may be applied to this embodiment.

The wireless device includes a processor 610, a power management module 611, a battery 612, a display 613, a keypad 614, a subscriber identification module (SIM) card 615, a memory 620, a transceiver 630, one or more antennas 631, a speaker 640, and a microphone 641.

The processor 610 may be configured to implement proposed functions, procedures and/or methods of the present disclosure described below. Layers of the radio interface protocol may be implemented in the processor 610. The processor 610 may include application-specific integrated circuit (ASIC), other chipset, logic circuit and/or data processing device. The processor 610 may be an application processor (AP). The processor 610 may include at least one of a digital signal processor (DSP), a central processing unit (CPU), a graphics processing unit (GPU), a modem (modulator and demodulator). An example of the processor 610 may be found in SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or a corresponding next generation processor.

The power management module 611 manages power for the processor 610 and/or the transceiver 630. The battery 612 supplies power to the power management module 611. The display 613 outputs results processed by the processor 610. The keypad 614 receives inputs to be used by the processor 610. The keypad 614 may be shown on the display 613. The SIM card 615 is an integrated circuit that is intended to securely store the international mobile subscriber identity (IMSI) number and its related key, which are used to identify and authenticate subscribers on mobile telephony devices (such as mobile phones and computers). It is also possible to store contact information on many SIM cards.

The memory 620 is operatively coupled with the processor 610 and stores a variety of information to operate the processor 610. The memory 620 may include read-only memory (ROM), random access memory (RAM), flash memory, memory card, storage medium and/or other storage device. When the embodiments are implemented in software, the techniques described herein can be implemented with modules (e.g., procedures, functions, and so on) that perform the functions described herein. The modules can be stored in the memory 620 and executed by the processor 610. The memory 620 can be implemented within the processor 610 or external to the processor 610 in which case those can be communicatively coupled to the processor 610 via various means as is known in the art.

The transceiver 630 is operatively coupled with the processor 610, and transmits and/or receives a radio signal. The transceiver 630 includes a transmitter and a receiver. The transceiver 630 may include baseband circuitry to process radio frequency signals. The transceiver 630 controls the one or more antennas 631 to transmit and/or receive a radio signal.

The speaker 640 outputs sound-related results processed by the processor 610. The microphone 641 receives sound-related inputs to be used by the processor 610.

In a transmission device, the processor 610 transmits information on a preamble puncturing pattern and transmits data through a 320 MHz band based on the preamble puncturing pattern.

In a reception device, the processor 610 receives information on a preamble puncturing pattern and receives data through a 320 MHz band based on the preamble puncturing pattern.

The preamble puncturing pattern is determined based on a unit of a first bandwidth in which clear channel assessment (CCA) is performed and a unit of a second bandwidth in which user-specific information is repeated. That is, the transmitting STA may determine the preamble puncturing pattern so that the receiving STA can decode all the user-specific information.

For example, the user-specific information may include first information and second information, and the first information and the second information may be repeated in units of the second bandwidth. Here, the unit of the first bandwidth may be 20 MHz, and the unit of the second bandwidth may be 40 MHz. Each of the first information and the second information may be allocated in units of 20 MHz.

In another example, the user-specific information may include first to fourth information, and the first to fourth information may be repeated in units of the second bandwidth. Here, the unit of the first bandwidth may be 20 MHz, and the unit of the second bandwidth may be 80 MHz. Each of the first to fourth information may be allocated in units of 20 MHz. In addition, the unit of the first bandwidth may be 40 MHz or 80 MHz.

The preamble puncturing pattern may be determined such that all of the user-specific information can be decoded within a primary 80 MHz. That is, the preamble puncturing pattern may be determined such that the first information and the second information can be decoded within the primary 80 MHz.

Further, the preamble puncturing pattern may be determined such that all of the user-specific information can be decoded within a primary 160 MHz. That is, the preamble puncturing pattern may be determined such that the first information and the second information can be decoded within the primary 160 MHz.

The 320 MHz band may include a primary 20 MHz, a secondary 20 MHz, a secondary 40 MHz, a first secondary 80 MHz, a second secondary 80 MHz, and a third secondary 80 MHz.

The primary 20 MHz may include one 20 MHz subchannel, and the secondary 20 MHz may include one 20 MHz subchannel. The secondary 40 MHz may include two 20 MHz subchannels. The first secondary 80 MHz may include four 20 MHz subchannels, the second secondary 80 MHz may include four 20 MHz subchannels, and the third secondary 80 MHz may include four 20 MHz subchannels. That is, the 320 MHz band may include a total of 16 20 MHz subchannels.

For example, the information on the preamble puncturing pattern may include CCA information on the primary 20 MHz, the secondary 20 MHz, and the third secondary 80 MHz.

Based on the CCA information, the primary 20 MHz may be determined to be idle, the secondary 20 MHz may be determined to be idle, and at least one 20 MHz subchannel among the four 20 MHz subchannels of the third secondary 80 MHz may be determined to be idle. Accordingly, the preamble puncturing pattern may be determined such that the first information and the second information can be decoded within the primary 80 MHz (or 160 MHz), because the first information can be decoded in the primary 20 MHz, and the second information can be decoded in the secondary 20 MHz.

In another example, the information on the preamble puncturing pattern may include CCA information on the primary 20 MHz, the secondary 40 MHz, the first secondary 80 MHz, and the second secondary 80 MHz.

Based on the CCA information, the primary 20 MHz may be determined to be idle, the secondary 40 MHz may be determined to be idle, and at least one 20 MHz subchannel among the four 20 MHz subchannels of the first secondary 80 MHz and the second secondary 80 MHz may be determined to be idle. Likewise, the preamble puncturing pattern may be determined such that the first information and the second information can be decoded within the primary 80 MHz (or 160 MHz), because the first information can be decoded in the primary 20 MHz, and the second information can be decoded in the secondary 40 MHz.

In still another example, the information on the preamble puncturing pattern may include CCA information on the primary 20 MHz, the secondary 40 MHz, and the second secondary 80 MHz.

Based on the CCA information, the primary 20 MHz may be determined to be idle, the secondary 40 MHz may be determined to be idle, and at least one 20 MHz subchannel among the four 20 MHz subchannels of the second secondary 80 MHz may be determined to be idle. Likewise, the preamble puncturing pattern may be determined such that the first information and the second information can be decoded within the primary 80 MHz (or 160 MHz), because the first information can be decoded in the primary 20 MHz, and the second information can be decoded in the secondary 40 MHz.

Among the total of 16 20 MHz subchannels in the 320 MHz band, all or some remaining 20 MHz subchannels excluding a 20 MHz subchannel determined to be idle based on the CCA information may be determined to be busy.

At least one 20 MHz subchannel is punctured based on the preamble puncturing pattern in the 320 MHz band. The at least one 20 MHz subchannel may be included in the remaining 20 MHz subchannels.

The at least one 20 MHz subchannel may be determined to be busy. The at least one 20 M Hz subchannel may be included in the secondary 40 MHz, the first secondary 80 MHz, the second secondary 80 MHz, and the third secondary 80 MHz.

That is, the transmitting STA may puncture a 20 MHz subchannel determined to be busy in a wide bandwidth, such as the secondary 40 MHz, the first secondary 80 MHz, or the secondary 160 MHz (the second secondary 80 MHz and the third secondary 80 MHz), and may transmit data using remaining bands that are not punctured, thereby increasing channel and resource efficiency.

The data may be transmitted through an extremely high throughput (EHT) physical protocol data unit (PPDU). The EHT PPDU may be a PPDU supporting an EHT WLAN system or an 802.11be WLAN system. The EHT PPDU may include an EHT-Signal (SIG)-A field and an EHT-SIG-B field.

The information on the preamble puncturing pattern may be included in the EHT-SIG-A field.

The EHT-SIG-B field may include allocation information on a resource unit (RU) in which the at least one 20 MHz subchannel is punctured in the 320 MHz band.

The transmitting STA may receive a block acknowledgement (BA) of the data. The data may be transmitted through the RU, and the BA may be received through the RU. That is, the BA may be received through the same channel as that through which the data is transmitted. In this case, the RU may correspond to the remaining bands that are not punctured in the 320 MHz band.

The foregoing technical features of the present disclosure are applicable to various applications or business models. For example, the foregoing technical features may be applied for wireless communication in a device supporting artificial intelligence (AI).

Artificial intelligence refers to a field of study on artificial intelligence or methodologies for creating artificial intelligence, and machine learning refers to a field of study on methodologies for defining and solving various issues in the area of artificial intelligence. Machine learning is also defined as an algorithm for improving the performance of an operation through steady experiences of the operation.

An artificial neural network (ANN) is a model used in machine learning and may refer to an overall problem-solving model that includes artificial neurons (nodes) forming a network by combining synapses. The artificial neural network may be defined by a pattern of connection between neurons of different layers, a learning process of updating a model parameter, and an activation function generating an output value.

The artificial neural network may include an input layer, an output layer, and optionally one or more hidden layers. Each layer includes one or more neurons, and the artificial neural network may include synapses that connect neurons. In the artificial neural network, each neuron may output a function value of an activation function of input signals input through a synapse, weights, and deviations.

A model parameter refers to a parameter determined through learning and includes a weight of synapse connection and a deviation of a neuron. A hyperparameter refers to a parameter to be set before learning in a machine learning algorithm and includes a learning rate, the number of iterations, a mini-batch size, and an initialization function.

Learning an artificial neural network may be intended to determine a model parameter for minimizing a loss function. The loss function may be used as an index for determining an optimal model parameter in a process of learning the artificial neural network.

Machine learning may be classified into supervised learning, unsupervised learning, and reinforcement learning.

Supervised learning refers to a method of training an artificial neural network with a label given for learning data, wherein the label may indicate a correct answer (or result value) that the artificial neural network needs to infer when the learning data is input to the artificial neural network. Unsupervised learning may refer to a method of training an artificial neural network without a label given for learning data. Reinforcement learning may refer to a training method for training an agent defined in an environment to choose an action or a sequence of actions to maximize a cumulative reward in each state.

Machine learning implemented with a deep neural network (DNN) including a plurality of hidden layers among artificial neural networks is referred to as deep learning, and deep learning is part of machine learning. Hereinafter, machine learning is construed as including deep learning.

Further, the foregoing technical features may be applied to wireless communication of a robot.

Robots may refer to machinery that automatically process or operate a given task with own ability thereof. In particular, a robot having a function of recognizing an environment and autonomously making a judgment to perform an operation may be referred to as an intelligent robot.

Robots may be classified into industrial, medical, household, military robots and the like according uses or fields. A robot may include an actuator or a driver including a motor to perform various physical operations, such as moving a robot joint. In addition, a movable robot may include a wheel, a brake, a propeller, and the like in a driver to run on the ground or fly in the air through the driver.

In addition, the foregoing technical features may be applied to a device supporting extended reality.

Extended reality collectively refers to virtual reality (VR), augmented reality (AR), and mixed reality (MR). VR technology is a computer graphic technology of providing a real-world object and background only in a CG image, AR technology is a computer graphic technology of providing a virtual CG image on a real object image, and MR technology is a computer graphic technology of providing virtual objects mixed and combined with the real world.

MR technology is similar to AR technology in that a real object and a virtual object are displayed together. However, a virtual object is used as a supplement to a real object in AR technology, whereas a virtual object and a real object are used as equal statuses in MR technology.

XR technology may be applied to a head-mount display (TIMID), a head-up display (HUD), a cellular phone, a tablet PC, a laptop computer, a desktop computer, a TV, digital signage, and the like. A device to which XR technology is applied may be referred to as an XR device.

Claims disclosed herein can be combined in a various way. For example, technical features of method claims of the present disclosure can be combined to be implemented or performed in an apparatus, and technical features of apparatus claims can be combined to be implemented or performed in a method. Further, technical features of method claims and apparatus claims can be combined to be implemented or performed in an apparatus. Further, technical features of method claims and apparatus claims can be combined to be implemented or performed in a method.

What is claimed is:

1. A method for transmitting data in a wireless local area network (WLAN) system, the method comprising:

transmitting, by a transmitting station (STA), information on a preamble puncturing pattern to a receiving STA; and transmitting, by the transmitting STA, data to the receiving STA through a 320 MHz band based on the preamble puncturing pattern, wherein the preamble puncturing pattern is determined based on a unit of a first bandwidth in which clear channel assessment (CCA) is performed and a unit of a second bandwidth in which user-specific information is repeated, wherein at least one 20 MHz subchannel is punctured in the 320 MHz band based on the preamble puncturing pattern, wherein the user-specific information comprises first information and second information, wherein the first information and the second information are repeated in units of the second bandwidth, wherein the unit of the first bandwidth is 20 MHz, and wherein the unit of the second bandwidth is 40 MHz.

2. The method of claim 1, wherein the 320 MHz band comprises a primary 20 MHz, a secondary 20 MHz, a secondary 40 MHz, a first secondary 80 MHz, a second secondary 80 MHz, and a third secondary 80 MHz,
- the primary 20 MHz comprises one 20 MHz subchannel,
- the secondary 20 MHz comprises one 20 MHz subchannel,
- the secondary 40 MHz comprises two 20 MHz subchannels,
- the first secondary 80 MHz comprises four 20 MHz subchannels,
- the second secondary 80 MHz comprises four 20 MHz subchannels, and
- the third secondary 80 MHz comprises four 20 MHz subchannels.

3. The method of claim 2, wherein the information on the preamble puncturing pattern comprises CCA information on the primary 20 MHz, the secondary 20 MHz, and the third secondary 80 MHz, and
- wherein, based on the CCA information, the primary 20 MHz is determined to be idle, the secondary 20 MHz is determined to be idle, and at least one 20 MHz subchannel among the four 20 MHz subchannels of the third secondary 80 MHz is determined to be idle.

4. The method of claim 2, wherein the information on the preamble puncturing pattern comprises CCA information on the primary 20 MHz, the secondary 40 MHz, the first secondary 80 MHz, and the second secondary 80 MHz, and
- wherein, based on the CCA information, the primary 20 MHz is determined to be idle, the secondary 40 MHz is determined to be idle, and at least one 20 MHz subchannel among the four 20 MHz subchannels of the first secondary 80 MHz and the second secondary 80 MHz is determined to be idle.

5. The method of claim 2, wherein the information on the preamble puncturing pattern comprises CCA information on the primary 20 MHz, the secondary 40 MHz, and the second secondary 80 MHz,
- wherein, based on the CCA information, the primary 20 MHz is determined to be idle, the secondary 40 MHz is determined to be idle, and at least one 20 MHz subchannel among the four 20 MHz subchannels of the second secondary 80 MHz is determined to be idle.

6. The method of claim 2, wherein the data is transmitted through an extremely high throughput (EHT) physical protocol data unit (PPDU),
- the EHT PPDU comprises an EHT-Signal (SIG)-A field and an EHT-SIG-B field, and
- the information on the preamble puncturing pattern is comprised in the EHT-SIG-A field.

7. The method of claim 6, wherein the EHT-SIG-B field comprises allocation information on a resource unit (RU) in which the at least one 20 MHz subchannel is punctured in the 320 MHz band,
- the at least one 20 MHz subchannel is determined to be busy, and
- the at least one 20 MHz subchannel is comprised in the secondary 40 MHz, the first secondary 80 MHz, the second secondary 80 MHz, and the third secondary 80 MHz.

8. The method of claim 7, further comprising:
receiving, by the transmitting STA, a block acknowledgement (BA) of the data,
- wherein the data is transmitted through the RU, and the BA is received through the RU.

9. A transmitting station (STA) for transmitting data in a wireless local area network (WLAN) system, the transmitting STA comprising:
- a memory;
- a transceiver; and
- a processor operatively connected to the memory and the transceiver,
- wherein the processor is configured to:
- transmit information on a preamble puncturing pattern to a receiving STA and
- transmit data to the receiving STA through a 320 MHz band based on the preamble puncturing pattern,
- wherein the preamble puncturing pattern is determined based on a unit of a first bandwidth in which clear channel assessment (CCA) is performed and a unit of a second bandwidth in which user-specific information is repeated,
- wherein at least one 20 MHz subchannel is punctured in the 320 MHz band based on the preamble puncturing pattern,
- wherein the user-specific information comprises first information and second information,
- wherein the first information and the second information are repeated in units of the second bandwidth,
- wherein the unit of the first bandwidth is 20 MHz, and
- wherein the unit of the second bandwidth is 40 MHz.

10. The transmitting STA of claim 9, wherein the 320 MHz band comprises a primary 20 MHz, a secondary 20 MHz, a secondary 40 MHz, a first secondary 80 MHz, a second secondary 80 MHz, and a third secondary 80 MHz,
- the primary 20 MHz comprises one 20 MHz subchannel,
- the secondary 20 MHz comprises one 20 MHz subchannel,
- the secondary 40 MHz comprises two 20 MHz subchannels,
- the first secondary 80 MHz comprises four 20 MHz subchannels,
- the second secondary 80 MHz comprises four 20 MHz subchannels, and
- the third secondary 80 MHz comprises four 20 MHz subchannels.

11. The transmitting STA of claim 10, wherein the information on the preamble puncturing pattern comprises CCA information on the primary 20 MHz, the secondary 20 MHz, and the third secondary 80 MHz, and
- wherein, based on the CCA information, the primary 20 MHz is determined to be idle, the secondary 20 MHz is determined to be idle, and at least one 20 MHz subchannel among the four 20 MHz subchannels of the third secondary 80 MHz is determined to be idle.

12. The transmitting STA of claim 10, wherein the information on the preamble puncturing pattern comprises CCA information on the primary 20 MHz, the secondary 40 MHz, the first secondary 80 MHz, and the second secondary 80 MHz, and
- wherein, based on the CCA information, the primary 20 MHz is determined to be idle, the secondary 40 MHz is determined to be idle, and at least one 20 MHz subchannel among the four 20 MHz subchannels of the first secondary 80 MHz and the second secondary 80 MHz is determined to be idle.

13. The transmitting STA of claim 10, wherein the information on the preamble puncturing pattern comprises CCA information on the primary 20 MHz, the secondary 40 MHz, and the second secondary 80 MHz,
- wherein, based on the CCA information, the primary 20 MHz is determined to be idle, the secondary 40 MHz is determined to be idle, and at least one 20 MHz subchannel among the four 20 MHz subchannels of the second secondary 80 MHz is determined to be idle.

14. The transmitting STA of claim 10, wherein the data is transmitted through an extremely high throughput (EHT) physical protocol data unit (PPDU),
the EHT PPDU comprises an EHT-Signal (SIG)-A field and an EHT-SIG-B field, and
the information on the preamble puncturing pattern is comprised in the EHT-SIG-A field.

15. The transmitting STA of claim 14, wherein the EHT-SIG-B field comprises allocation information on a resource unit (RU) in which the at least one 20 MHz subchannel is punctured in the 320 MHz band,
the at least one 20 MHz subchannel is determined to be busy, and
the at least one 20 MHz subchannel is comprised in the secondary 40 MHz, the first secondary 80 MHz, the second secondary 80 MHz, and the third secondary 80 MHz.

16. The transmitting STA of claim 15, wherein the processor is further configured to receive a block acknowledgement (BA) of the data,
wherein the data is transmitted through the RU, and the BA is received through the RU.

17. A method for receiving data in a wireless local area network (WLAN) system, the method comprising:
receiving, by a receiving station (STA), information on a preamble puncturing pattern from a transmitting STA; and
receiving, by the receiving STA, data from the transmitting STA through a 320 MHz band based on the preamble puncturing pattern,
wherein the preamble puncturing pattern is determined based on a unit of a first bandwidth in which clear channel assessment (CCA) is performed and a unit of a second bandwidth in which user-specific information is repeated,
wherein at least one 20 MHz subchannel is punctured in the 320 MHz band based on the preamble puncturing pattern,
wherein the user-specific information comprises first information and second information,
wherein the first information and the second information are repeated in units of the second bandwidth,
wherein the unit of the first bandwidth is 20 MHz, and
wherein the unit of the second bandwidth is 40 MHz.

* * * * *